(12) United States Patent
Kanematsu et al.

(10) Patent No.: US 9,132,593 B2
(45) Date of Patent: Sep. 15, 2015

(54) HOLLOW CELL ARRAY STRUCTURE AND METHOD AND APPARATUS FOR PRODUCING HOLLOW CELL ARRAY STRUCTURE

(75) Inventors: Toshihiro Kanematsu, Kanagawa (JP); Masaru Ohgaki, Kanagawa (JP); Shinji Aoki, Kanagawa (JP); Shinya Seno, Kanagawa (JP); Masahiro Masuzawa, Kanagawa (JP); Hisayoshi Ohshima, Kanagawa (JP); Yukie Inoue, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 93 days.

(21) Appl. No.: 13/376,797

(22) PCT Filed: Jul. 8, 2010

(86) PCT No.: PCT/JP2010/061930
§ 371 (c)(1),
(2), (4) Date: Dec. 7, 2011

(87) PCT Pub. No.: WO2011/004909
PCT Pub. Date: Jan. 13, 2011

(65) Prior Publication Data
US 2012/0114876 A1  May 10, 2012

(30) Foreign Application Priority Data

Jul. 10, 2009 (JP) .................................. 2009-163724
Jun. 16, 2010 (JP) .................................. 2010-137154

(51) Int. Cl.
*B05D 5/00* (2006.01)
*B05D 3/06* (2006.01)
(Continued)

(52) U.S. Cl.
CPC .... *B29D 11/00365* (2013.01); *B29D 11/00298* (2013.01); *B29D 22/00* (2013.01); *G02F 2001/1672* (2013.01)

(58) Field of Classification Search
CPC .................. B29D 11/00298; B29D 11/00365; B29D 22/00; C12Q 1/6883; C12Q 2600/158
USPC ........................................................ 427/508
See application file for complete search history.

(56) References Cited

U.S. PATENT DOCUMENTS

| 4,334,524 A | 6/1982 | McCullough et al. |
| 2008/0220204 A1 | 9/2008 | Ohgaki et al. |

(Continued)

FOREIGN PATENT DOCUMENTS

| JP | 56-34780 | 8/1981 |
| JP | 08-112873 | 5/1996 |

(Continued)

OTHER PUBLICATIONS

Taiwanese Office Action dated Jul. 15, 2013 issued in Application No. 099122669 (with English translation).

(Continued)

*Primary Examiner* — Dah-Wei D Yuan
*Assistant Examiner* — Kristen A Dagenais
(74) *Attorney, Agent, or Firm* — Harness, Dickey & Pierce

(57) ABSTRACT

A disclosed method for producing a hollow cell array structure includes a first step of layering a deformable material capable of being plastically deformed under a predetermined condition on a first substrate, the first substrate having plural, mutually separated depressions in a surface thereof, such that the deformable material forms mutually isolated spaces in the corresponding depressions; a second step of expanding the spaces in the plural depressions by inducing a gas pressure of the spaces while extending the deformable material on the first substrate, such that plural hollow cells are simultaneously formed in correspondence to the plural depressions in predetermined directions; and a third step of selectively solidifying portions of the plural hollow cells by selectively applying ultraviolet rays thereto.

4 Claims, 29 Drawing Sheets

(51) Int. Cl.
  *B05C 9/14* (2006.01)
  *B05D 3/02* (2006.01)
  *B29D 11/00* (2006.01)
  *B29D 22/00* (2006.01)
  *G02F 1/167* (2006.01)

(56) References Cited

U.S. PATENT DOCUMENTS

| | | | |
|---|---|---|---|
| 2009/0133804 | A1 | 5/2009 | Kanematsu et al. |
| 2010/0035040 | A1 | 2/2010 | Masuzawa et al. |
| 2010/0188731 | A1 | 7/2010 | Kanematsu et al. |
| 2012/0114876 | A1 | 5/2012 | Kanematsu et al. |

FOREIGN PATENT DOCUMENTS

| | | | |
|---|---|---|---|
| JP | 10-080964 A | | 3/1998 |
| JP | H11-142608 A | | 5/1999 |
| JP | 2003-291159 A | | 10/2003 |
| JP | 2007098930 A | | 4/2007 |
| JP | 2008-093861 | | 4/2008 |
| JP | 2008093861 A | | 4/2008 |
| JP | 2008183759 A | | 8/2008 |
| JP | 2008224766 A | | 9/2008 |
| JP | 2008224769 A | | 9/2008 |
| JP | 2009214374 A | | 9/2009 |
| JP | 2010-042668 A | | 2/2010 |
| TW | 200404188 A | | 3/2004 |
| TW | 200732139 A | | 9/2007 |
| TW | 200848236 A | | 12/2008 |
| TW | 200900826 A | | 1/2009 |
| WO | WO 2004/025356 | | 3/2004 |
| WO | WO 2004025356 A2 | * | 3/2004 |
| WO | WO-2004025356 A2 | | 3/2004 |
| WO | WO 2007/029864 | | 3/2007 |
| WO | WO 2007029864 A1 | * | 3/2007 |
| WO | WO 2008093543 A1 | * | 8/2008 |
| WO | WO-2008111596 A1 | | 9/2008 |

OTHER PUBLICATIONS

Japanese Office Action dated Nov. 26, 2013, issued in Application No. JP 2009-163724.
Japanese Office Action dated May 27, 2014 for corresponding Japanese Application No. 2010-137154.
PCT/ISA/210 and PCT/ISA/237, 2010.

* cited by examiner

_US 9,132,593 B2_

HOLLOW CELL ARRAY STRUCTURE AND METHOD AND APPARATUS FOR PRODUCING HOLLOW CELL ARRAY STRUCTURE

TECHNICAL FIELD

The invention generally relates to a high-precision hollow cell array structure formed of plural fine components and a method and an apparatus for producing such a high-precision hollow cell array structure. More particularly, a technology of the present invention is applicable to the production of miniature plastic lenses for use in optical scanning systems of copying machines, facsimile machines, solid-state scanning type printers, and the like, or optical waveguides having built-in miniature lenses designed for optical transmission, production of lenses of digital cameras, production of optical fiber plate used for projector screens, touch panels, photoreceptors for electrophotographic processes, PLDs, and the like. Specifically, the invention relates to a high-precision hollow cell array structure suitable for use in an electrophoretic display formed of cells having appropriately designed shapes, sizes, and aspect ratios, each cell containing a solvent having electrically-charged pigment particles (or colored particles) dispersed therein. The invention particularly relates to a novel and useful method for producing such a high-precision hollow cell array structure suitable for use in an electrophoretic display.

BACKGROUND ART

There are generally two related art technologies for producing the high precision hollow cell array structure formed of plural fine components, which are (1) a photolithography and (2) an embossing process. However, in producing a honeycomb structure by photolithography, it is comparatively difficult to stably produce the honeycomb structure having an aspect ratio of 5 or more at relatively low cost. In producing a honeycomb structure by the embossing process, it is difficult to make all honeycomb walls thin (e.g., thickness of 10 μm or less with aspect ratio of 5 or more). FIGS. 20A through 20D illustrate steps of a method for producing a fine honeycomb structure (one-side openings) according to the related art. FIG. 20A illustrates the step of applying an aqueous gelatin solution 51 on a first substrate 52 having plural depressions 53, and reducing the ambient pressure on the obtained product (i.e., the first substrate 52 covered with gelatin solution 51). FIG. 20B illustrates the step of expanding a gelatin film 54 in a vertical direction due to pressure of gases held in the plural depressions 53 of the first substrate 52 by the gelatin film 54, and FIG. 20C illustrates a step of drying and cooling the resulting product of FIG. 20B under a reduced pressure, thereby obtaining a honeycomb structure 55. FIG. 20D illustrates the step of forming openings in a thin ceiling film (i.e., gelatin film) that faces a second substrate 57 by placing the honeycomb structure 55 that has been left at room temperature (e.g., about 20° C.) into a heating and humidifying container 56 heated at a temperature of 30° C. (higher than room temperature) with humidity of 80 to 90%. Since the temperature of the honeycomb structure 55 is lower than the temperature inside the heating and humidifying container 56, condensation is formed on a surface (i.e., thin ceiling film) of the honeycomb structure 55. FIG. 20E illustrates the step of forming openings in the thin ceiling film of a honeycomb structure 58 due to autogeneous shrinkage induced by its surface tension. Since the condensation is formed on the thin ceiling film of the honeycomb structure 55 and the rigidity of the thin ceiling film is lowered, openings are formed in the thin ceiling film of the honeycomb structure 55 due to autogenous shrinkage of the gelatin film induced by surface tension. The thin ceiling film of the honeycomb structure 55 is particularly thin around the center of each cell thereof, and therefore the openings form initially around the center of each cell. Condensation time is controlled in order to obtain desired opening shape corresponding to each cell. The honeycomb structure 55 is removed from the heating and humidifying container 56, and is thereafter dried in order to terminate the formation of the openings. In a case of the ceiling film having thickness of 0.05 μm, the openings are formed in 20 s.

Japanese Laid-Open Patent Application Publication No. 8-112873 (hereinafter also called "Patent Document 1") discloses an example of a method for forming a hollow cell array structure by foaming. This technology intends to provide foam exhibiting excellent lightweight properties, insulating properties, and compressive strength. The disclosed technology includes uniformly forming a thermoplastic resin foam having high expansion ratio of 20 times in square hollows of cells of a thermoplastic resin member having a lattice-like horizontal section, thereby providing sheet foam. Japanese Laid-Open Patent Application Publication No. 10-80964 (hereinafter also called "Patent Document 2") discloses a technology for producing a honeycomb structure; specifically, a technology for producing a hollow cell array structure having a stable quality with time. This technology provides a honeycomb structure formed of polyhedral column-like cells densely and three-dimensionally arranged in the resin member without having junctions between cell walls of the polyhedral column-like cells. The cells are obtained by systematically and three-dimensionally arranging foaming agents in the resin member and causing the foaming agents to generate bubbles in the resin member. However, this technology involves extending cell walls of the polyhedral column-like cells, so that the core portions of the polyhedral column-like cells are gradually becoming thin as the polyhedral column-like cells are extended. Accordingly, the cell walls of the polyhedral column-like cells may not be retained at a predetermined thickness with stability. That is, in the foaming step of this technology, it is important to cause foaming agents in spaces formed separately and systematically arranged in depressions of the resin member to generate bubbles simultaneously. If foaming agents in spaces formed separately and systematically arranged in depressions of the resin member generate bubbles sequentially in depressions of the resin member, individual bubbles may form spheres. Therefore, an intact honeycomb structure may not be obtained. In the above Patent Documents 1 and 2, a thermal foaming method is employed. However, with this method, if a temperature is not uniform over the entire resin member, time for foaming varies with different portions of the resin member. As a result, an intact honeycomb structure may not be obtained.

Japanese Examined Patent Application Publication No. 56-34780 (hereinafter also called "Patent Document 3") discloses a technology for producing a honeycomb structure utilizing a stretching force of the opening operation of a platen. However, with this technology, it is also important but difficult to produce the honeycomb structure having uniform viscosity. In addition, Japanese Laid-Open Patent Application Publication No. 2007-98930 (hereinafter also called "Patent Document 4") discloses a technology for producing a fine honeycomb structure having thin cell walls and oblong cells. The technology includes a first step of placing a first material having plastic deformation properties under a predetermined condition on a first substrate having plural separate depressions having spaces, and a second step of extending the first material having plastic deformation properties by inducing gas pressure in the spaces such that there are formed oblong hollow cells in predetermined directions.

Embodiments of the invention are devised in view of the above and other problems. That is, if such thin cell walls and cells forming a fine hollow cell array structure (i.e., honeycomb structure) are desired to be used as pixel cells of an image display apparatus such as an electrophoretic display, the fine hollow cell array structure needs to have uniform thin cell walls and cells into which an injecting material is injected in order to function as the display. However, in this technology, sizes of openings in the fine hollow cell array structure are determined based on the openings formed of fine depressions in the first substrate. Accordingly, if the sizes of the openings formed of fine depressions in the first substrate are small, an injecting material may not be easily injected into the openings of the fine cells of the fine hollow cell array structure. Conversely, if the sizes of the openings formed of fine depressions in the first substrate are large, a material forming the fine hollow cell array structure may accidentally be injected into the first openings formed of fine depressions in the first substrate, while covering the first substrate with the material forming the fine hollow cell array structure. As a result, it may be difficult to form uniform cell spaces in the depressions of the fine hollow cell array structure. If the hollow sizes of the depressions are various or the first material is accidentally injected into the openings of fine depressions in the first substrate, the expansion amount of gas in the fine hollow cell array structure changes. As a result, the fine hollow cell array structure having uniform cell walls and cells may not be obtained due to change in heights of the cells and thicknesses of the cell walls.

If the hollow cell array structure includes openings at both upper and lower surfaces, the above problem may be solved by forming the openings of the first substrate side larger than the openings of the hollow cell array structure side. However, it appears to be difficult to expand adjacent numerous separate hollows to form the hollow cell array structure, then remove a thin ceiling film formed over the cell walls of the hollow cell array structure, and immediately solidify the cell walls of the hollow cell array structure while maintaining an intact shape of the hollow cell array structure. With the above technology, an additional step of melting the thin ceiling film using solvent vapor may be required for removing the thin ceiling film over the cells of the hollow cell array structure, which results in increasing the production cost.

SUMMARY OF THE INVENTION

Accordingly, it is a general object of the present invention to provide a novel and useful method capable of rapidly and stably producing a fine hollow cell array structure having openings at upper and lower surfaces within a typical production process of the hollow cell array structure. The method generally includes: a first step of layering a deformable material capable of being plastically deformed under a predetermined condition on a first substrate, the first substrate having plural, mutually separated depressions in an upper surface thereof, such that the deformable material forms a mutually isolated space in each of the plural depressions; a second step of expanding the space in each of the plural depressions by inducing a gas pressure thereof while extending the deformable material, such that plural hollow cells (into which an injecting material is injected in a later process) are simultaneously formed in correspondence to the plural depressions in predetermined directions; and a third step of selectively solidifying cell walls of the plural hollow cells excluding ceiling surfaces of the cell walls.

According to one embodiment, there is provided a method for producing a hollow cell array structure that includes a first step of layering a deformable material capable of being plastically deformed under a predetermined condition on a first substrate, the first substrate having plural, mutually separated depressions in a surface thereof, such that the deformable material forms mutually isolated spaces in the corresponding depressions; a second step of expanding the spaces in the plural depressions by inducing a gas pressure of the spaces while extending the deformable material on the first substrate, such that plural hollow cells are simultaneously formed in correspondence to the plural depressions in predetermined directions; and a third step of selectively solidifying portions of the plural hollow cells by selectively applying ultraviolet rays thereto.

According to another embodiment, there is provided a method for producing a hollow cell array structure that includes a first step of layering a deformable material capable of being cured by application of ultraviolet rays on a first substrate, the first substrate having plural, mutually separated depressions, such that the deformable material forms mutually isolated spaces in the corresponding depressions; a second step of layering a second substrate having predetermined-shaped light-shielding patterns on the first substrate having the plural depressions via the deformable material forming the mutually isolated spaces in the plural depressions, and expanding the spaces in the plural depressions by inducing a gas pressure of the spaces while extending the deformable material, such that plural hollow cells are simultaneously formed in correspondence to the plural depressions in predetermined directions; and a third step of selectively solidifying portions of the plural hollow cells by selectively applying ultraviolet rays to the portions of the plural hollow cells via the predetermined-shaped light-shielding patterns formed on the second substrate.

According to still another embodiment, there is provided an apparatus for producing a hollow cell array structure that includes a coating device configured to layer a deformable material capable of being plastically deformed under a predetermined condition on a first substrate, the first substrate having plural, mutually separated depressions in a surface thereof, such that the deformable material forms mutually isolated spaces in the corresponding depressions; a pressure control device configured to expand the spaces in the plural depressions by inducing a gas pressure of the spaces while extending the deformable material on the first substrate, such that plural hollow cells are simultaneously formed in correspondence to the plural depressions in predetermined directions; and a solidifying device configured to selectively solidify portions of the plural hollow cells by selectively applying ultraviolet rays to the portions of the plural hollow cells, where ultraviolet ray transmitting patterns are formed on first portions of the first substrate, and the light-shielding patterns are formed on second portions of the first substrate and entire surfaces of the plural depressions of the first substrate.

Other objects, features, and advantages of the present invention will become more apparent from the following detailed description when read in conjunction with the accompanying drawings.

BEST MODE FOR CARRYING OUT THE INVENTION

Preferred embodiments of the present invention are described below with reference to the accompanying drawings. Note that elements, types, combinations, and relative arrangements of the elements described in the following embodiments are only examples and not limited thereto unless otherwise specified. Various modifications or alteration may be made within the scope of the invention described in the claims. FIG. 1A to FIG. 1D are diagrams illustrating respective steps of a method for producing a hollow cell array structure according to a first embodiment.

Figure 1A:
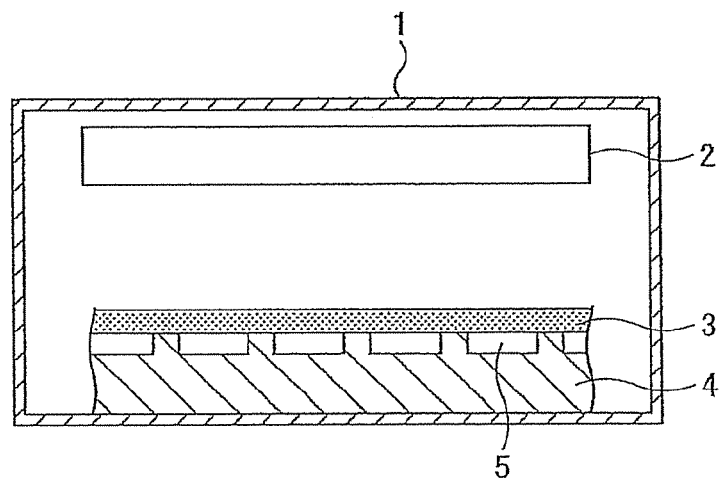
FIG. 1A to FIG. 1D are diagrams illustrating respective steps of a method for producing a hollow cell array structure according to a first embodiment.

FIG. 1A illustrates a step of applying a material 3 composed of uncured UV-curable resin and surfactant over a first substrate 4 having plural depressions by slit coating or spin coating and reducing an ambient pressure on the obtained product (i.e., the first substrate 4 covered with the material 3).

Figure 1B:
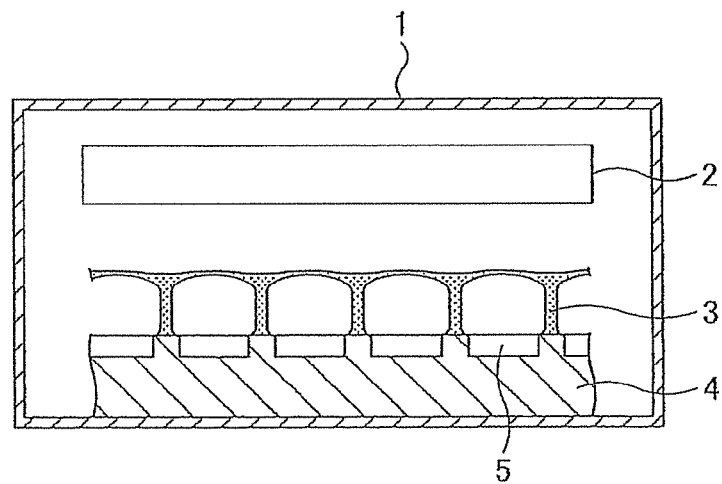

FIG. 1B illustrates a step of causing the gases held between depressions 5 of the first substrate 4 and corresponding portions of the UV-curable resin film 3 to expand such that the corresponding portions of the UV-curable resin film are extended in vertical directions while controlling one another, thereby obtaining a fine hollow cell array structure.

Figure 1C:
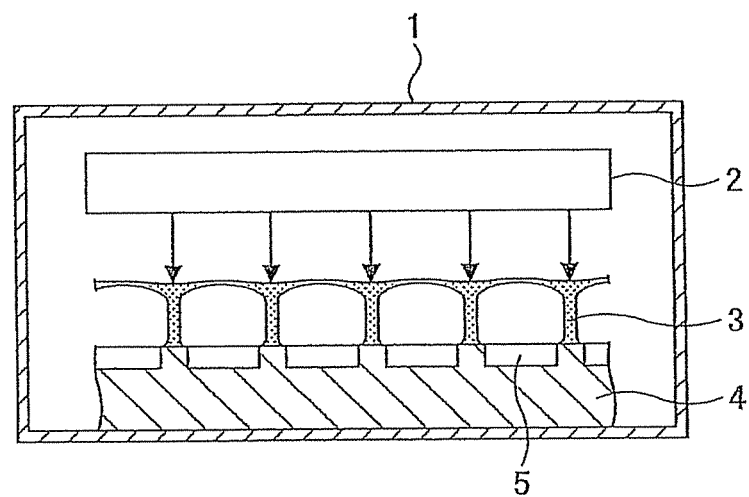

FIG. 1C illustrates a step of selectively curing the UV-curable resin 3 corresponding to cell walls of the fine hollow cell array structure extended in the vertical directions from the first substrate 4 by allowing a UV ray plotting device 2 to selectively apply the UV rays to the cell walls of the UV-curable resin 3. Note that the UV ray plotting device 2 may be either a scanning system in which the UV rays are applied via a raster optical system, or a UV-exposing system in which the UV rays are applied via masks.

Figure 1D:
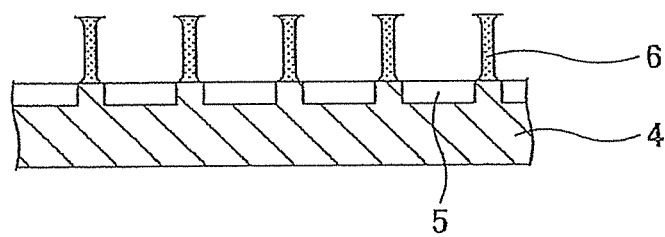

FIG. 1D illustrates ceiling portions of a fine hollow cell array structure that results in openings. The ceiling portions of cells of the hollow cell array structure 6 remain uncured and result in openings. As a result, the fine hollow cell array structure 6 having the respective openings at upper and lower surfaces may be obtained. With this method, it is relatively easy to control the sizes of the openings. Hence, an injecting material such as an electrophoretic dispersion may be securely injected into hollow portions of the cells in the fine hollow cell array structure 6 with ease.

FIG. 2A to FIG. 2D are diagrams illustrating respective steps of a method for producing a hollow cell array structure according to a second embodiment.

Figure 2A:
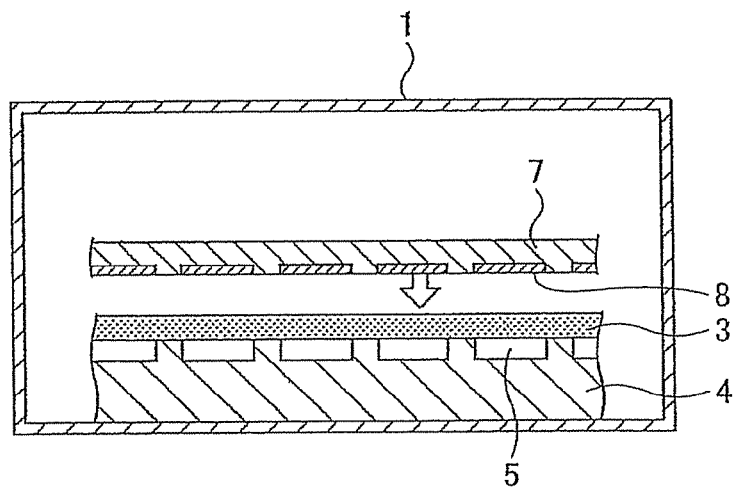
FIG. 2A to FIG. 2D are diagrams illustrating respective steps of a method for producing a hollow cell array structure according to a second embodiment.

FIG. 2A illustrates a step of applying a material 3 composed of uncured UV-curable resin and a surfactant over a first substrate 4 having plural depressions 5 by slit coating or spin coating, placing an ultraviolet-ray transmitting glass having light-shielding patterns 8 as a second substrate 7 on the material 3 applied over the first substrate 4 having the plural depressions 5, aligning the light-shielding patterns 8 on the second substrate 7 with the plural depressions 5 in the first substrate 4, with the material 3 composed of the uncured UV-curable resin and the surfactant being sandwiched between the first and second substrates 4 and 7, and reducing an ambient pressure on the obtained product (i.e., the material 3 sandwiched between the first and second substrates). In this step, the material 3 composed of the uncured UV-curable resin and the surfactant may be applied to the ultraviolet-ray transmitting glass (i.e., the second substrate 7) and then the first substrate 4 may be placed on the second substrate 7 via the material 3. In the second embodiment, urethane acrylate (manufactured by Arakawa Chemical Industries, Ltd.) is used as the UV-curable resin, Irgacure 500 is used as an initiator, and Novec FC-4430 is used as the surfactant.

Figure 2B:
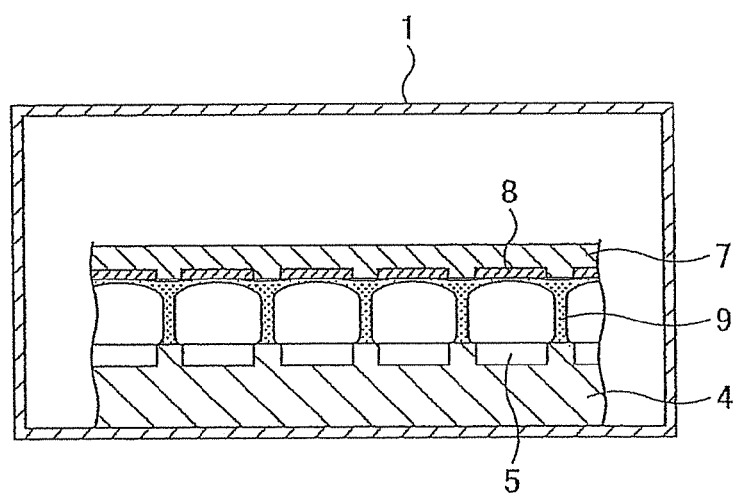

FIG. 2B illustrates a step of causing the gases held between the depressions 5 and corresponding portions of the UV-curable resin film to expand such that the corresponding portions of the UV-curable resin film are extended in vertical directions while controlling one another, thereby obtaining a fine hollow cell array structure 9.

Figure 2C:
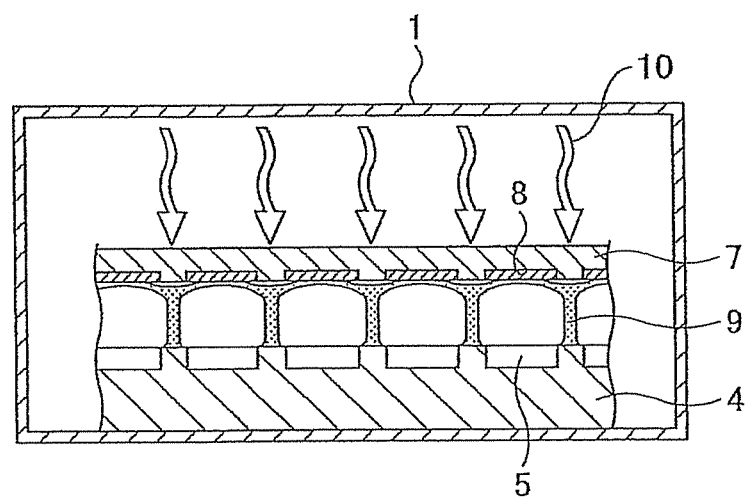

FIG. 2C illustrates a step of selectively curing the UV-curable resin corresponding to cell walls of the fine hollow cell array structure 9 extended in the vertical directions from the first substrate 4 by allowing a not-shown UV ray plotting device to selectively apply UV rays 10 to the cell walls of the UV-curable resin via the second substrate 7 having the light-shielding patterns 8.

Figure 2D:
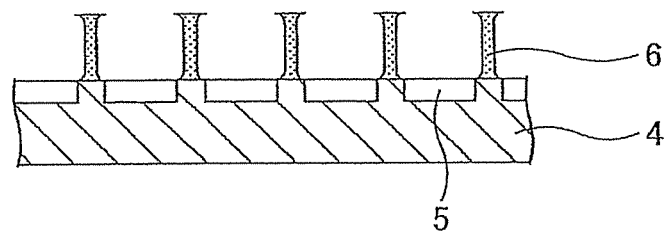

FIG. 2D illustrates ceiling portions of the fine hollow cell array structure 9 that results in openings. The ceiling portions of cells of the fine hollow cell array structure 9 remain uncured and result in openings. As a result, a fine hollow cell array structure 6 having the respective openings at upper and lower surfaces may be obtained. It is sufficient to apply the UV rays 10 to the UV-curable resin for several seconds to form the fine hollow cell array structure 6 having a height of 50 μm, a pitch of 150 μm, and a cell wall thickness of 5 μm. Although the time to form the fine hollow cell array structure 6 may vary with a pressure reducing rate of a pressure reducing container 1, it may be possible to form the fine hollow cell array structure 6 having openings at upper and lower surfaces within 10 seconds by carrying out a process including a pressure reducing step, a curing step, and a recovering an ordinary pressure step. With this method, it is relatively easy to control the sizes of the openings. Hence, an injecting material such as an electrophoretic dispersion may securely be injected into the hollow portions of the cells in the fine hollow cell array structure 6 with ease.

FIG. 3A to FIG. 3D are diagrams illustrating respective steps of a method for producing a hollow cell array structure according to a third embodiment.

Figure 3A:
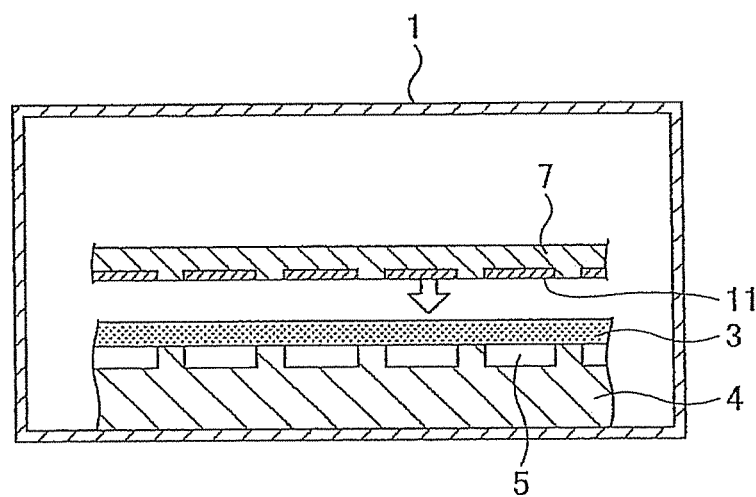
FIG. 3A to FIG. 3D are diagrams illustrating respective steps of a method for producing a hollow cell array structure according to a third embodiment.

FIG. 3A illustrates a step of applying a material 3 composed of a resin solution obtained by dissolving resin in a solvent or a resin dispersion obtained by dispersing resin in a solvent over a first substrate 4 having plural depressions 5 by slit coating or spin coating, placing an ultraviolet-ray transmitting glass having solvent transmittable patterns (fine porous patterns) 11 as a second substrate 7 on the material 3 applied over the first substrate 4 having the plural depressions 5, aligning the solvent transmittable patterns 11 on the second substrate 7 with the plural depressions 5 in the first substrate 4, with the material 3 composed of the resin solution or the resin dispersion being sandwiched between the first and second substrates 4 and 7, and reducing an ambient pressure on the obtained product (i.e., the material 3 composed of the resin solution or the resin dispersion sandwiched between the first and second substrates 4 and 7). In this step, the material 3 composed of the resin solution or the resin dispersion may be applied to the ultraviolet-ray transmitting glass (i.e., the second substrate 7) and then the first substrate 4 may be placed on the second substrate 7 via the material 3. In the third embodiment, water dispersed urethane resin is used as the material 3 composed of the resin solution or the resin dispersion (hereinafter also called a "resin film" 3).

Figure 3B:
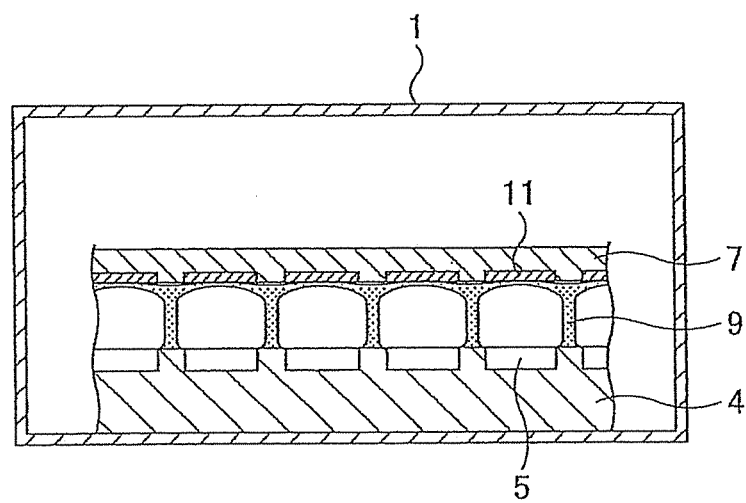

FIG. 3B illustrates a step of causing the gases held between the depressions 5 and corresponding portions of the resin film 3 to expand such that the corresponding portions of the resin film 3 are extended in vertical directions to form cell walls while controlling one another, thereby obtaining a fine hollow cell array structure 9.

Figure 3C:
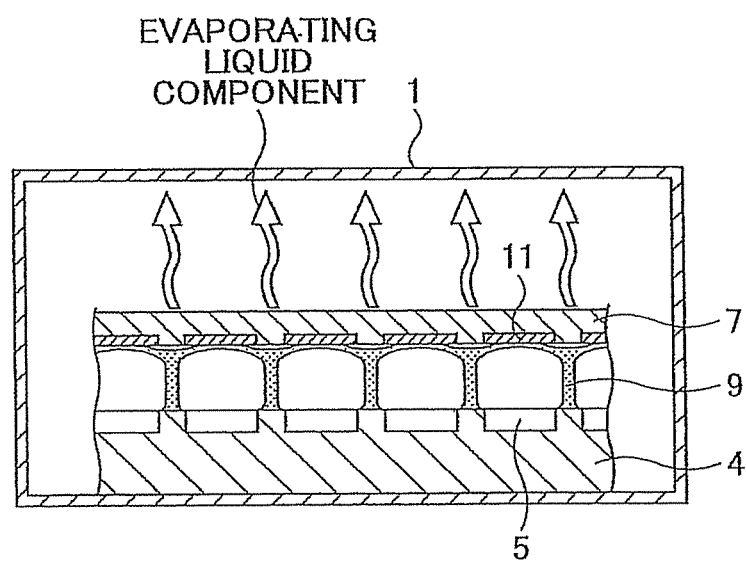

FIG. 3C illustrates a step of selectively solidifying the cell walls of the fine hollow cell array structure 9 extended in the vertical directions from the first substrate 4 by allowing the resin film 3 to evaporate water contained therein via the second substrate 7 having the solvent transmittable patterns (i.e., fine porous patterns) 11.

Figure 3D:
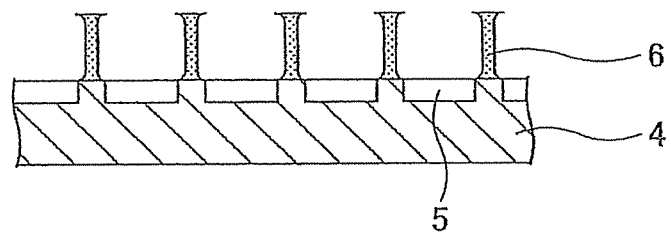

FIG. 3D illustrates ceiling portions of the fine hollow cell array structure 9 that result in openings. The ceiling portions of cells of the fine hollow cell array structure 9 remain unsolidified and thus result in openings. As a result, a fine hollow cell array structure 6 having the respective openings at upper and lower surfaces may be obtained. Since the solidification of the resin film is slow, the fine hollow cell array structure 6 having the respective openings at upper and lower surfaces may be obtained. With this method, it is relatively easy to control the sizes of the openings. Hence, an injecting material such as an electrophoretic dispersion may securely be injected into respective hollow portions of the cells in the fine hollow cell array structure with ease. Note that the solvent transmittable patterns (fine porous patterns) 11 may be formed by printing resin patterns capable of partially transmitting water on a micromesh sheet used for filtration.

FIG. 4A to FIG. 4D are diagrams illustrating respective steps of a method for producing a hollow cell array structure according to a fourth embodiment.

Figure 4A:
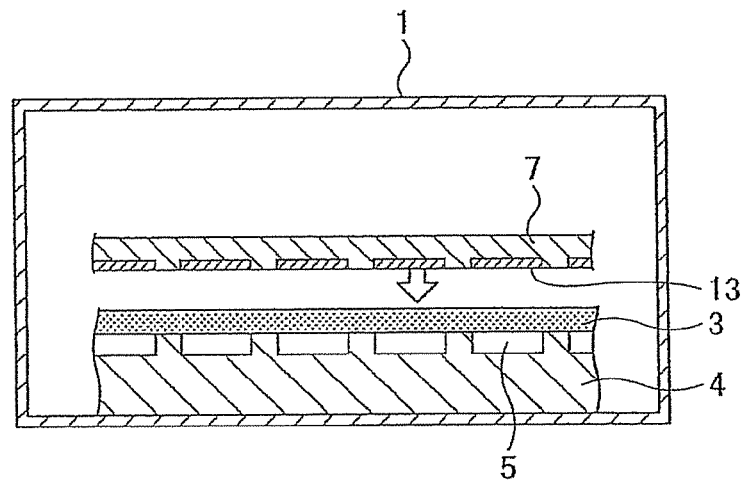
FIG. 4A to FIG. 4D are diagrams illustrating respective steps of a method for producing a hollow cell array structure according to a fourth embodiment.

FIG. 4A illustrates a step of applying a material 3 composed of resin having a viscosity being lowered at a predetermined temperature over a first substrate 4 having the plural depressions 5 with heating (i.e., heated resin is applied over the first substrate 4), placing a second substrate 7 having patterned heating materials 13 (hereinafter called "heating patterns 13") over the first substrate 4 having the plural depressions 5 via the material 3 composed of the resin having the viscosity being lowered at the predetermined temperature, aligning the heating patterns 13 on the second substrate 7 with the plural depressions 5 in the first substrate 4, with the material 3 composed of the resin having the viscosity being lowered at the predetermined temperature being sandwiched between the first and second substrates 4 and 7, and reducing an ambient pressure on the obtained product (i.e., the material 3 composed of the resin having the viscosity being lowered at the predetermined temperature sandwiched between the first and second substrates 4 and 7). In this step, the material 3 composed of the resin having the viscosity being lowered at the predetermined temperature may be applied to the second substrate 7 and then the first substrate 4 may be placed on the second substrate 7 via the material 3. In the fourth embodiment, low-density polyethylene resin is used as the material 3 composed of the resin having the viscosity being lowered at the predetermined temperature (hereinafter also called a "resin film" 3).

Figure 4B:
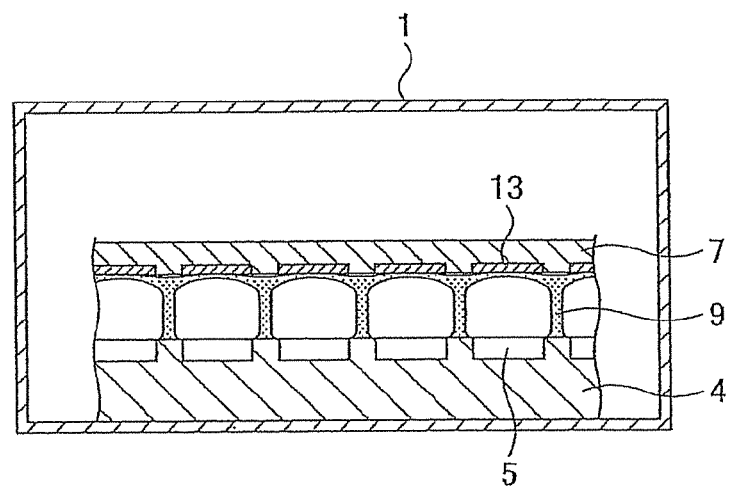

FIG. 4B illustrates a step of causing the gases held between the depressions 5 and corresponding portions of the resin film 3 to expand such that the corresponding portions of the resin film 3 are extended in vertical directions to form cell walls while controlling one another, thereby obtaining a fine hollow cell array structure 9.

Figure 4C:
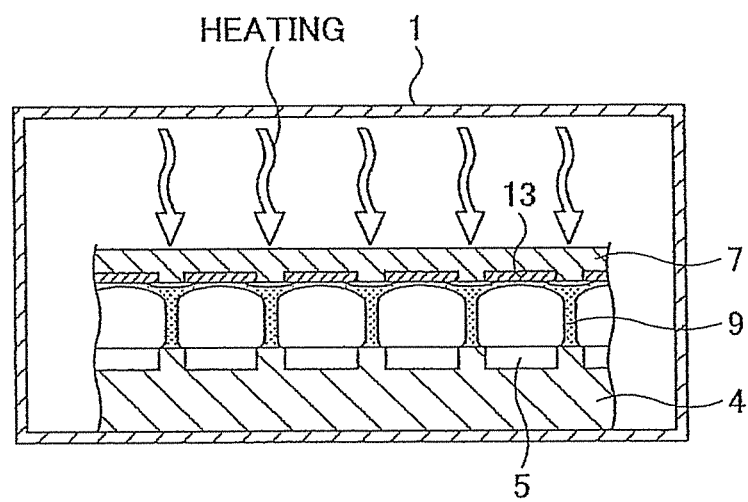

FIG. 4C illustrates a step of selectively heating ceiling portions of the fine hollow cell array structure 9 at least at a temperature for lowering its viscosity while preventing the ceiling portions from being solidified with cooling, and initially solidifying the cell walls of the fine hollow cell array structure 9 extended in the vertical directions from the first substrate 4 with cooling.

Figure 4D:
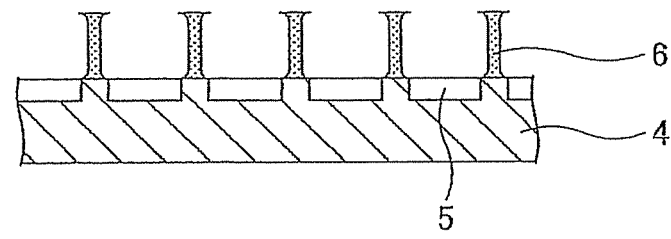

FIG. 4D illustrates a step of separating the second substrate 7 from the partially solidified fine hollow cell array structure 9, with the ceiling portions being melted. As a result, a fine hollow cell array structure 6 having the respective openings at upper and lower surfaces may be obtained. With this method, an injecting material such as an electrophoretic dispersion may securely be injected into the hollow portions of the fine hollow cell array structure 6 with ease. Note that the heating patterns 13 of the second substrate 7 may be formed by printing resin patterns on a micromesh sheet used for filtration.

FIG. 5A to FIG. 5D are diagrams illustrating respective steps of a method for producing a hollow cell array structure according to a fifth embodiment.

Figure 5A:
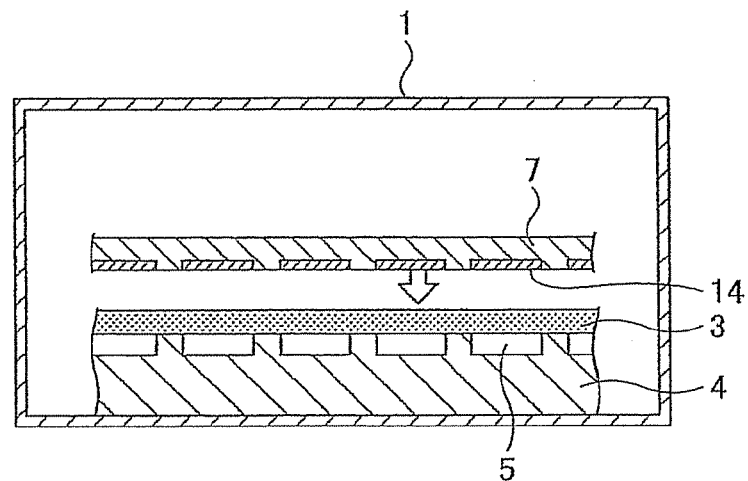
FIG. 5A to FIG. 5D are diagrams illustrating respective steps of a method for producing a hollow cell array structure according to a fifth embodiment.

FIG. 5A illustrates a step of applying a material 3 composed of uncured UV-curable resin and a surfactant over a first substrate 4 having plural depressions 5 by slit coating or spin coating, placing an ultraviolet-ray transmitting glass having water repellent surface patterns 14 as a second substrate 7 on the material 3 over the first substrate 4 having the plural depressions 5, aligning the water repellent surface patterns 14 on the second substrate 7 with the plural depressions 5 in the first substrate 4, with the material 3 composed of the uncured UV-curable resin and the surfactant being sandwiched between the first and second substrates 4 and 7, and reducing the ambient pressure on the obtained product. In this step, the material 3 composed of the uncured UV-curable resin and the surfactant may be applied to the second substrate 7 and then the first substrate 4 may be placed on the second substrate 7 via the material 3. In the fifth embodiment, polyethylene glycol diacrylate PEG 400DA (manufactured by Daicel Chemical Industries, Ltd.) is used as the UV-curable resin, Irgacure 500 is used as an initiator, and Novec FC-4430 is used as the surfactant.

Figure 5B:
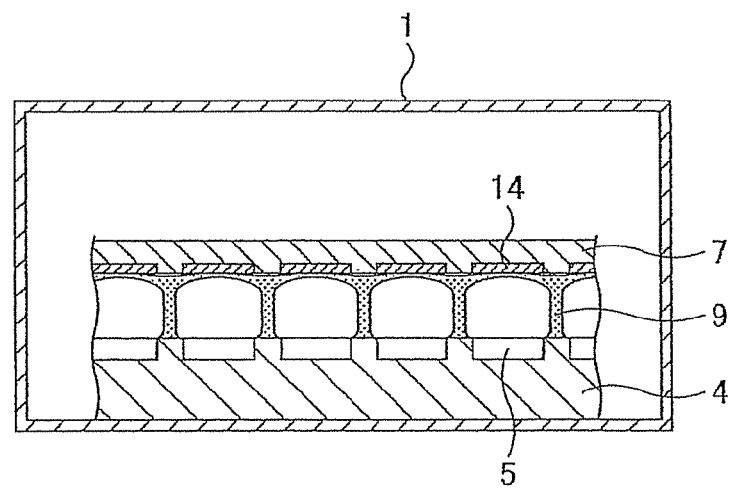

FIG. 5B illustrates a step of causing the gases held between the depressions 5 and corresponding portions of the UN-curable resin film to expand such that the corresponding portions of the UV-curable resin film are extended in vertical directions to form cell walls with respect to a first substrate surface while controlling one another, thereby obtaining a fine hollow cell array structure 9.

Figure 5C:
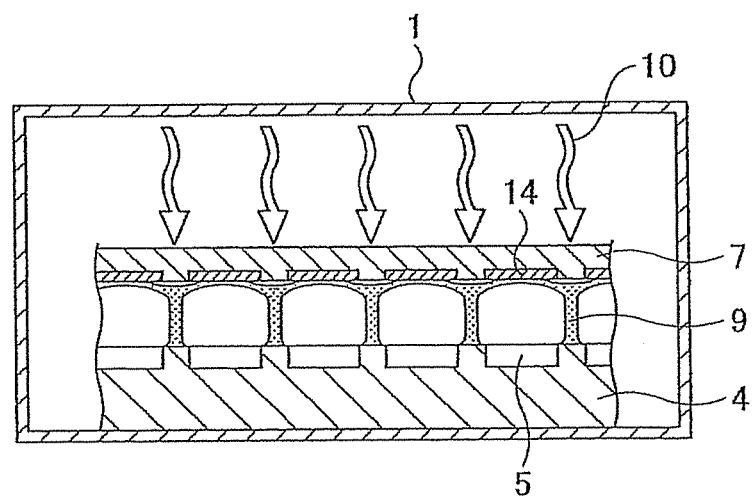

FIG. 5C illustrates a step of selectively curing the cell walls of the fine hollow cell array structure 9 extended in the vertical directions from the first substrate 4 by applying UV rays 10 to the cell walls of the UV-curable resin via the second substrate 7 having the water repellent surface patterns 14. Note that the portions of the second substrate 7 where the water repellent surface patterns 14 are applied repel the UV-curable resin, which facilitates selectively curing the cell walls of the UV-curable resin extended in the vertical directions.

Figure 5D:
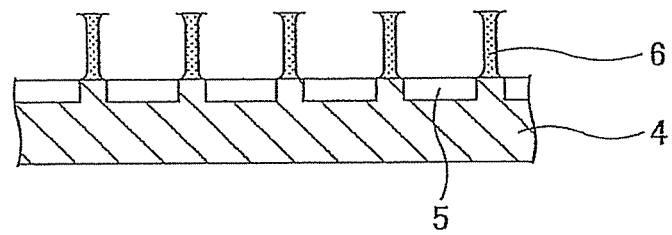

FIG. 5D illustrates a step of removing the second substrate 7 from the fine hollow cell array structure 9 (of FIG. 5C). As a result, a fine hollow cell array structure 6 having the respective openings at upper and lower surfaces may be obtained. It is sufficient to apply the UV rays 10 to the UV-curable resin for several seconds to form the fine hollow cell array structure 6 having a height of 50 μm, a pitch of 150 μm, and a cell wall thickness of 5 μm. Although the time to form the fine hollow cell array structure 6 may vary with a pressure reducing rate of a pressure reducing container 1, it may be possible to form the fine hollow cell array structure 6 having openings at upper and lower surfaces within 10 seconds by carrying out a process including a pressure reducing step, a curing step, and a recovering an ordinary pressure step. With this method, it is relatively easy to control the sizes of the openings. Hence, an injecting material such as an electrophoretic dispersion may be securely injected into the hollow portions of the cells in the fine hollow cell array structure 6 with ease.

FIG. 6A to FIG. 6D are diagrams illustrating respective steps of a method for producing a hollow cell array structure according to a sixth embodiment.

Figure 6A:
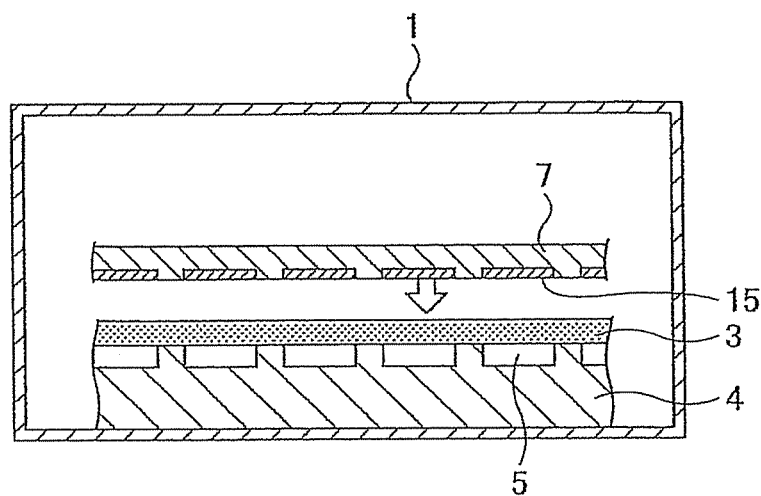
FIG. 6A to FIG. 6D are diagrams illustrating respective steps of a method for producing a hollow cell array structure according to a sixth embodiment.

FIG. 6A illustrates a step of applying a material 3 composed of uncured UV-curable resin and a surfactant over a first substrate 4 having plural depressions 5 by slit coating or spin coating, placing an ultraviolet-ray transmitting glass having lipophobic surface patterns 15 as a second substrate 7 on the material 3 over the first substrate 4 having the plural depressions 5, aligning the lipophobic surface patterns 15 on the second substrate 7 with the plural depressions 5 in the first substrate 4, with the material 3 composed of the uncured UV-curable resin and the surfactant being sandwiched between the first and second substrates 4 and 7, and reducing an ambient pressure on the obtained product (i.e., the material 3 composed of the uncured UV-curable resin and the surfactant sandwiched between the first and second substrates 4 and 7). In this step, the material 3 composed of the UV-curable resin and the surfactant may be applied to the second substrate 7 and then the first substrate 4 may be placed on the second substrate 7 via the material 3. In the sixth embodiment, epoxy acrylate AQ9 (manufactured by Arakawa Chemical Industries, Ltd.) is used as the UV-curable resin, Irgacure 500 is used as an initiator, and Novec FC-4430 is used as the surfactant.

Figure 6B:
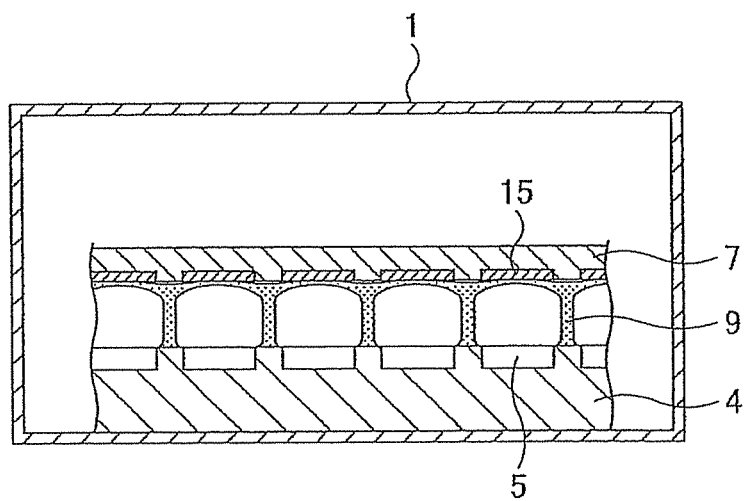

FIG. 6B illustrates a step of causing the gases held between the depressions 5 and corresponding portions of the UN-curable resin film to expand such that the corresponding portions of the UV-curable resin film are extended in vertical directions to form cell walls with respect to a first substrate 4 surface while controlling one another, thereby obtaining a fine hollow cell array structure 9.

Figure 6C:
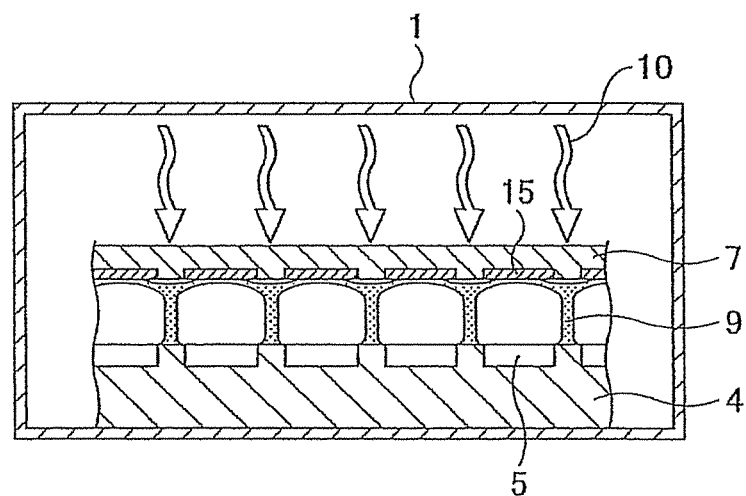

FIG. 6C illustrates a step of selectively curing the cell walls of the fine hollow cell array structure 9 extended in the vertical directions from the first substrate 4 by selectively applying UV rays 10 to the cell walls of the UV-curable resin via the second substrate 7 having the lipophobic surface patterns 15. Note that the portions of the second substrate 7 where the lipophobic surface patterns 15 are applied repel the UV-curable resin, which facilitates selectively curing the cell walls of the UV-curable resin extended in the vertical directions on the first substrate surface of the fine hollow cell array structure 9.

Figure 6D:
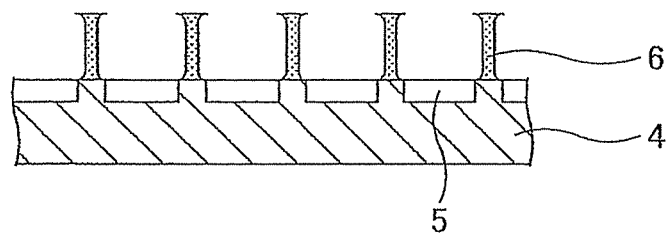

FIG. 6D illustrates a step of removing the second substrate 7 from the fine hollow cell array structure 9 (of FIG. 6C). As a result, a fine hollow cell array structure 6 having the respective openings at upper and lower surfaces may be obtained. It is sufficient to apply the UV rays 10 to the UV-curable resin for several seconds to form the fine hollow cell array structure 6 having a height of 50 μm, a pitch of 150 μm, and a cell wall thickness of 5 μm. Although the time to form the fine hollow cell array structure 6 may vary with a pressure reducing rate of a pressure reducing container 1, it may be possible to form the fine hollow cell array structure 6 having openings at upper and lower surfaces within 10 seconds by carrying out a process including a pressure reducing step, a curing step, and a recovering an ordinary pressure step. With this method, it is relatively easy to control the sizes of the openings. Hence, an injecting material such as an electrophoretic dispersion may be securely injected into the hollow portions of the cells in the fine hollow cell array structure 6 with ease.

Figure 7A:
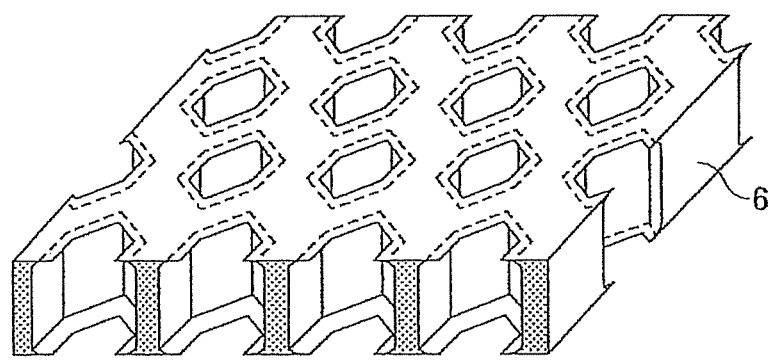
FIG. 7A is a perspective view illustrating one example of a fine hollow cell array structure and FIG. 7B is a corresponding sectional view.
Figure 7B:
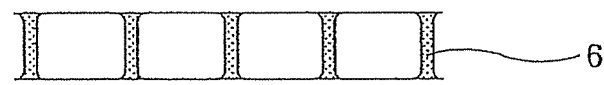

FIG. 7A is a perspective view illustrating one example of a fine hollow cell array structure 6 and FIG. 7B is a corresponding sectional view.

FIG. 8A to FIG. 8D are diagrams illustrating respective steps of a method for producing a hollow cell array structure according to a seventh embodiment. The method for producing a hollow cell array structure according to the seventh embodiment includes a step of applying a UV-curable material 3 on a first substrate 4 having plural depressions having light-shielding patterns 8, and applying UV rays 10 to the UV-curable material 3 from the first substrate 4 side when the material 3 is expandedly deformed due to a reduction in an ambient pressure. Note that the light-shielding patterns 8 are configured to allow only the total internal reflection light to pass through the fine hollow cell array structure 9. That is, a film is formed of the UV-curable material 3 on a second substrate 7 supporting the UV-curable material 3. Note that the UV-curable material 3 is the same material as those used in the second, fifth, and sixth embodiments. Note also that the first substrate 4 is made of a UV ray transmitting material and has the plural depressions having the light-shielding patterns 8. Specific examples of a material for the first substrate 4 include silica glass and silicone resin. The light-shielding patterns 8 may be made of any materials that can cut off UV rays. In the seventh embodiment, carbon or copper is used as the material for the light-shielding patterns 8. A method for processing the light-shielding patterns is a known method including, for example, applying the material for light-shielding patterns (carbon or copper), plating the applied material, and carrying out vapor deposition. Note that a pressure control apparatus includes a pressure reducing container 1 and a pressure reducing device (not shown), and is used for controlling the pressure inside the pressure reducing container 1. Note also that a UV radiation apparatus (not shown) is used for radiating UV rays.

Figure 8A:
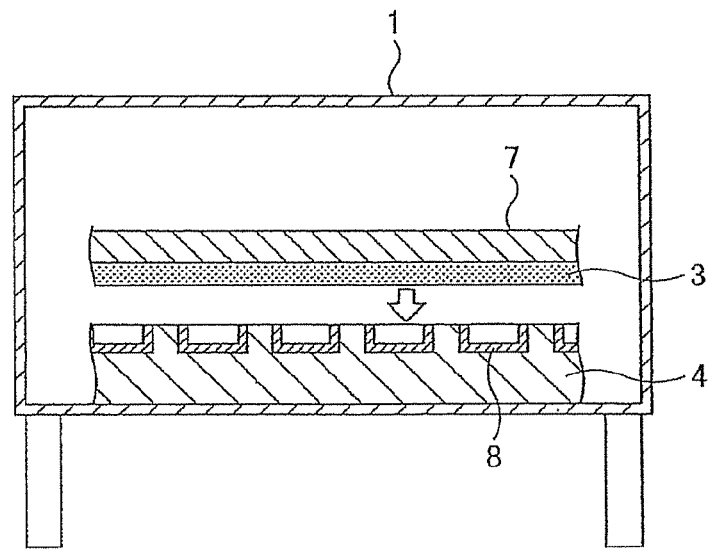
FIG. 8A to FIG. 8E are diagrams illustrating respective steps of a method for producing a hollow cell array structure according to a seventh embodiment.

FIG. 8A illustrates a step of tightly attaching the film composed of the UV-curable material 3 and the second substrate 7 on the first substrate 4, and placing the obtained product in the pressure reducing container 1.

Figure 8B:
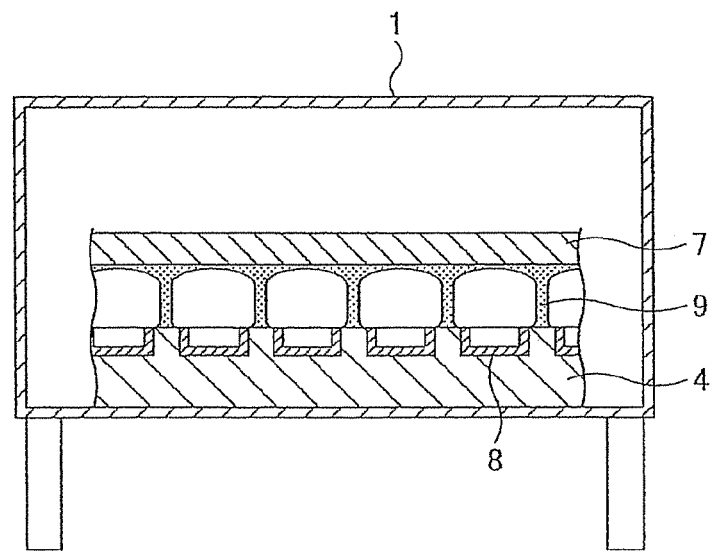

FIG. 8B illustrates a step of reducing the pressure of the pressure reducing container 1 to cause the material 3 of the film to relatively expand so as to obtain a fine hollow cell array structure 9.

Figure 8C:
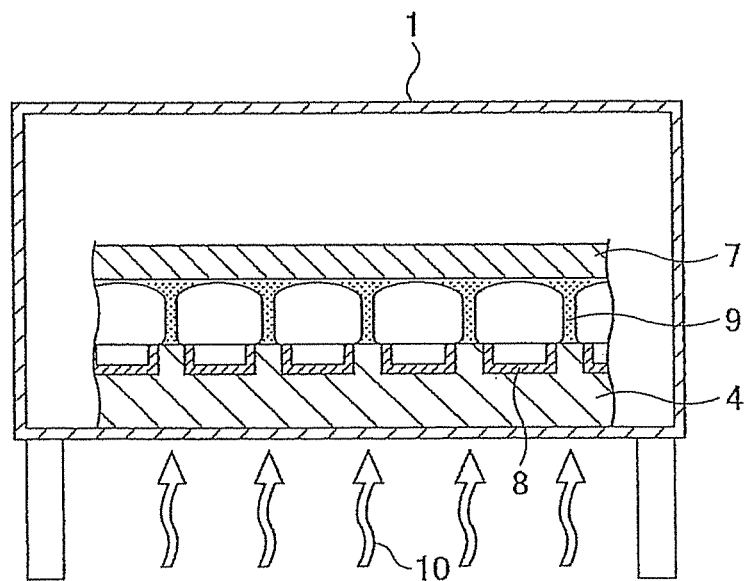

FIG. 8C illustrates a step of radiating UV rays from a lower side of the first substrate 4 (i.e., opposite side from the film) to cure the material 3 of the film so as to obtain the partially (selectively) cured fine hollow cell array structure 9.

Figure 8D:
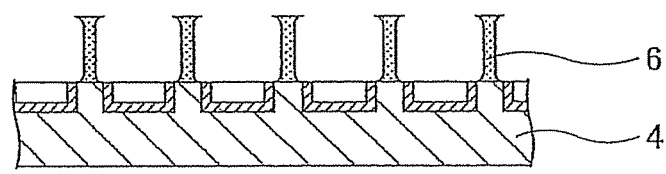

FIG. 8D illustrates a step of removing, after having taken out the first substrate 4, the second substrate 7 and the partially (selectively) cured fine hollow cell array structure 9 from the pressure reducing container 1, the second substrate 7 from the partially (selectively) cured fine hollow cell array structure 9. Note that uncured portions of the fine hollow cell array structure 9 are simultaneously removed with the second substrate 7, and the cured portions of the fine hollow cell array structure 9 remain on the first substrate 4.

Figure 8E:
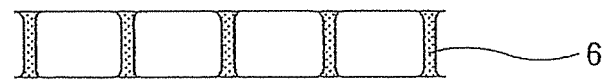

FIG. 8E illustrates a step of removing a resulting hollow cell array structure 6 from the first substrate 4. Note that the step of FIG. 8D and the step of FIG. 8E may be carried out in any order. That is, the step of FIG. 8D and the step of FIG. 8E may be carried out in reverse order. Since the light-shielding patterns 8 correspond to locations of the depressions, the fine hollow cell array structure 9 excluding its ceiling film can be cured without adjusting the location of the depressions with the light-shielding patterns 8 as illustrated from the second to sixth embodiments. That is, the fine hollow cell array structure 6 having the respective openings at upper and lower surfaces may be obtained.

Figure 9:
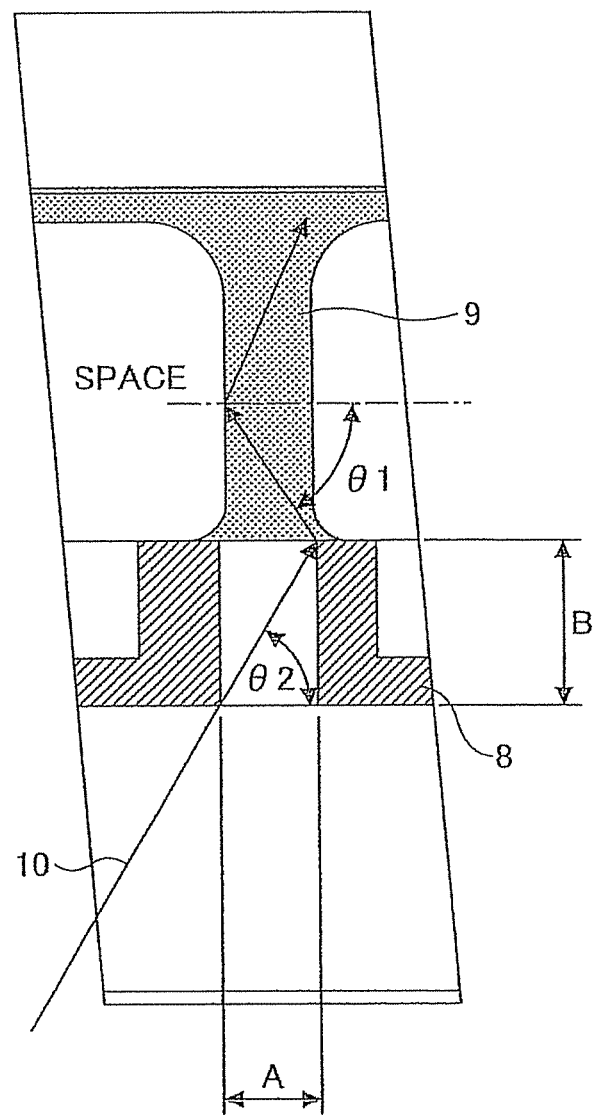
FIG. 9 is a diagram illustrating a detailed configuration of light-shielding patterns.

FIG. 9 is a diagram illustrating a detailed configuration of the light-shielding pattern. The total internal reflection light angle $\theta 1$ in the fine hollow cell array structure 9 is represented by the following equation: $\sin \theta 1 = Na/Nb$. In the equation, $Na$ represents a refractive index of space and $Nb$ represents a refractive index of the fine hollow cell array structure 9. The light-shielding pattern 8 is represented by the following equation: $\tan \theta 2 = B/A$. Since the light-shielding patterns 8 shields UV rays at the light-shielding ratio of $B/A$, resulting in $\theta 1 < \theta 2$ to transmit the total internal reflection light in the fine hollow cell array structure 9, the UV rays may efficiently pass through the fine hollow cell array structure 9 excluding the ceiling film (i.e., upper cell walls) of the fine hollow cell array structure 9 (i.e., fine hollow cell array structure 9 may be selectively cured). In the above descriptions of the embodiments, the UV rays 10 may be applied to the fine hollow array structure 9 via the second substrate 7 having the light-shielding patterns 8 as illustrated in FIG. 2C, or may be applied from the lower side of the first substrate 4 (i.e., opposite side from the film), such that the material 3 is selectively cured. However, directions of applying the UV rays may be optionally changed based on positions of the light-shielding patterns 8.

Figure 10A:
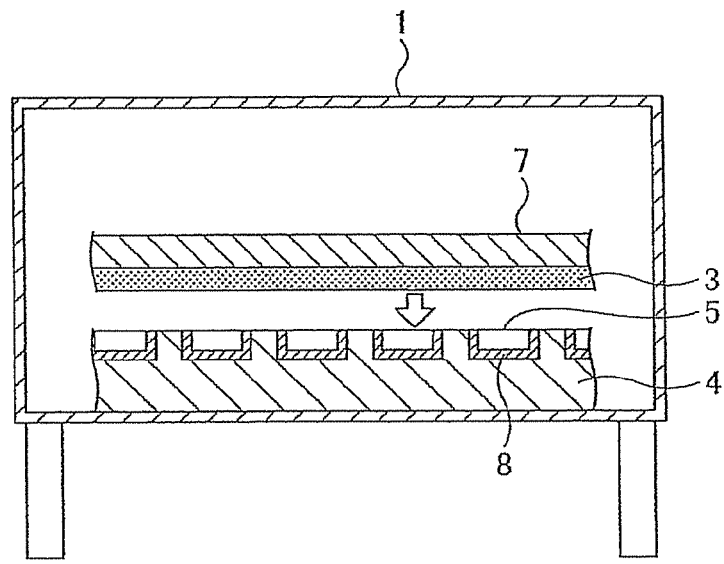
FIG. 10A to FIG. 10E are diagrams illustrating respective steps of a method for producing a hollow cell array structure according to an eighth embodiment.
Figure 12:
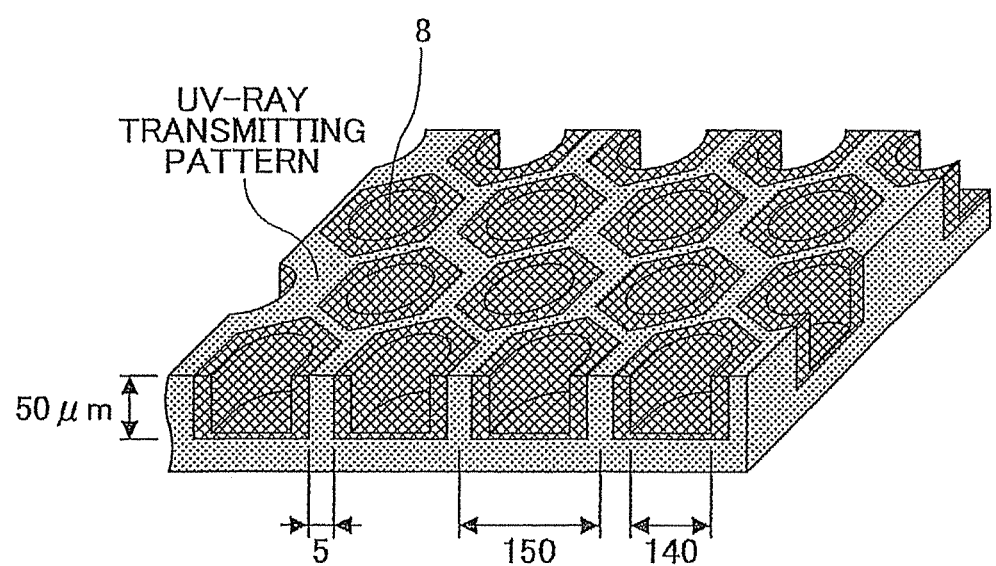
FIG. 12 is a perspective view illustrating a substrate having UV ray transmitting patterns on part of its surface.

FIGS. 10A through 10E, 11, 12, 13, 14, and 19 are diagrams illustrating respective steps of a method for producing a hollow cell array structure according to an eighth embodiment. A film that eventually constitutes a hollow cell array structure 9 is formed of a UV-curable material 3 and a second substrate 7 supporting the UV-curable material 3 (see FIG. 10A). As illustrated in FIG. 10A, a first substrate 4 is configured to include a planer surface portion with depressions 5, which is similar to a related art substrate configuration illustrated in FIG. 11. As illustrated in FIG. 12, the first substrate 4 is made of a UV ray transmitting material and part of its surface and its plural depressions 5 include the light-shielding patterns 8. Specific examples of a material for the first substrate 4 include silica glass and silicone resin. The light-shielding patterns 8 may be made of any materials that can cut off UV rays. In the eighth embodiment, carbon is used as the material for the light-shielding patterns 8. A method for processing the light-shielding patterns is a known method including, for example, applying the material for light-shielding patterns (carbon), plating the applied material, and carrying out vapor deposition.

Figure 13:
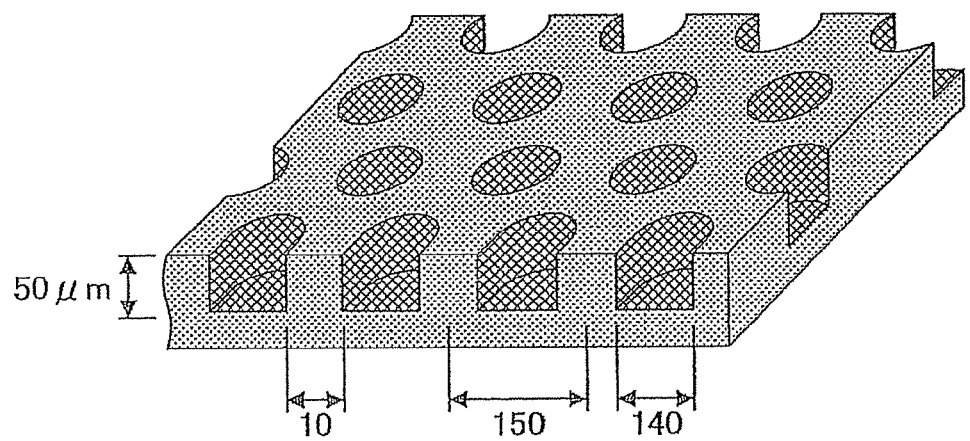
FIG. 13 is a perspective view illustrating a substrate having UV ray transmitting patterns on its entire surface.
Figure 14:
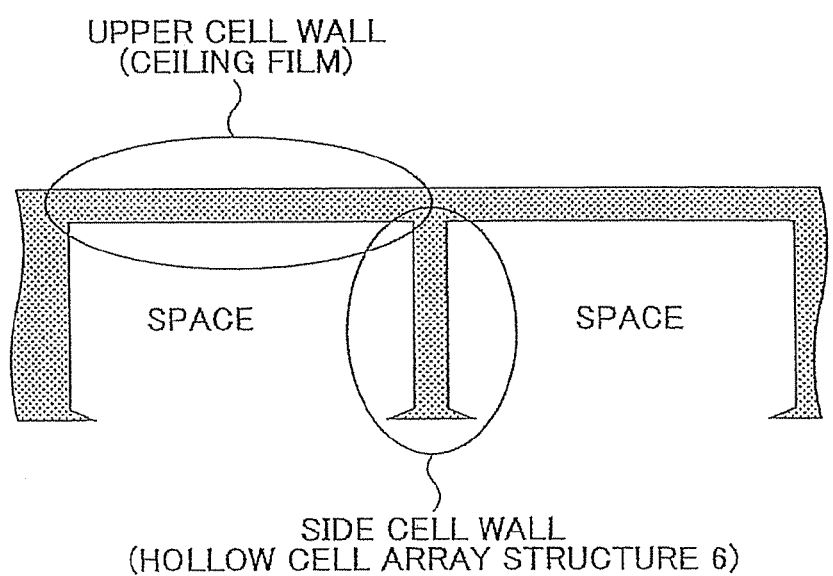
FIG. 14 is a sectional view illustrating a configuration of the fine hollow cell array structure.
Figure 19:
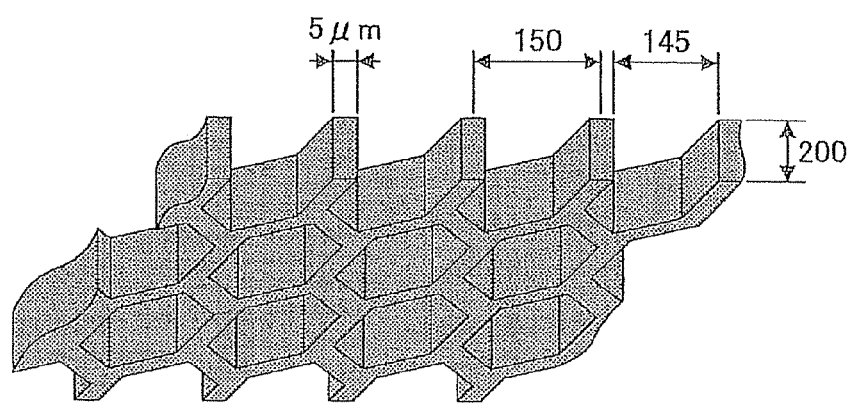
FIG. 19 is a view illustrating dimensions of corresponding portions of the a honeycomb structure.
Figure 20A:
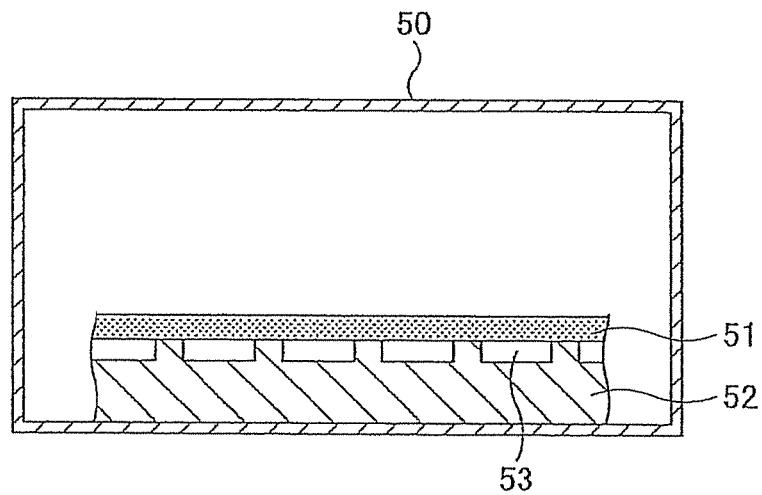
FIG. 20A to FIG. 20E are diagrams illustrating respective steps of a related art method for producing a hollow cell array structure.
Figure 20B:
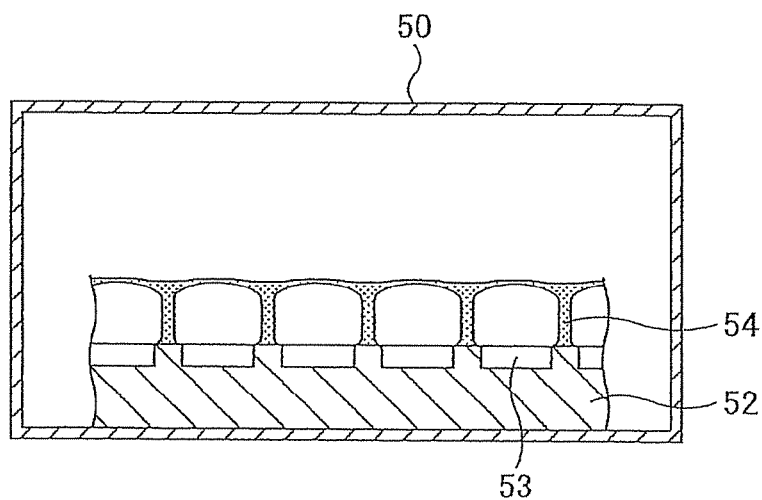
Figure 20C:
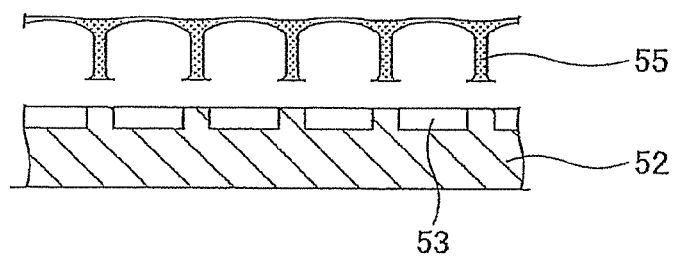
Figure 20D:
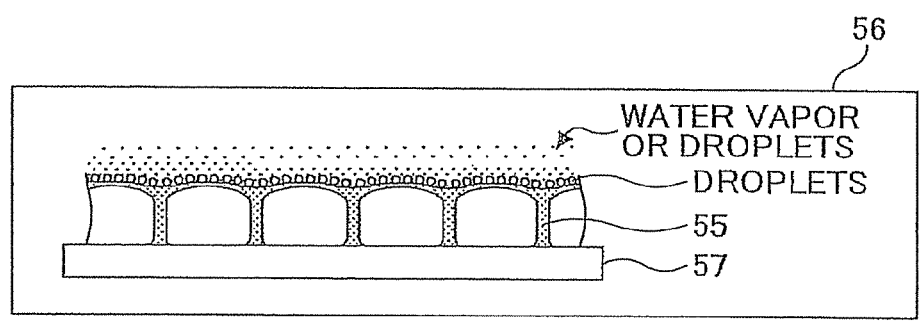
Figure 20E:

FIG. 13 illustrates the first substrate 4 according to the eighth embodiment. As illustrated in FIG. 13, the first substrate 4 includes UV ray transmitting patterns on its entire surface and light-shielding pattern in its depressions. A pressure control apparatus includes a pressure reducing container 1 (see FIG. 10A) and a pressure reducing device (not shown), and is used for controlling the pressure inside the pressure reducing container 1. Note also that a UV radiation apparatus (not shown) is used for radiating UV rays. As illustrated in FIG. 14, the hollow cell array structure 9 is a continuum composed of upper cell walls (i.e., ceiling film) and side cell walls (i.e., a hollow cell array structure 6). The hollow cell array structure 6 illustrated in FIG. 10E is a honeycomb structure having upper and lower openings produced by following steps of FIG. 10A to 10D. FIG. 19 illustrates a perspective view of the hollow cell array structure 6 having the upper and lower openings with corresponding dimensions.

Next, the steps for producing the hollow cell array structure 6 having the upper and lower openings is described below.

FIG. 10A illustrates a step of tightly attaching a film composed of the UV-curable material 3 and the second substrate 7 on the first substrate 4, and placing the obtained product in the pressure reducing container 1.

Figure 10B:
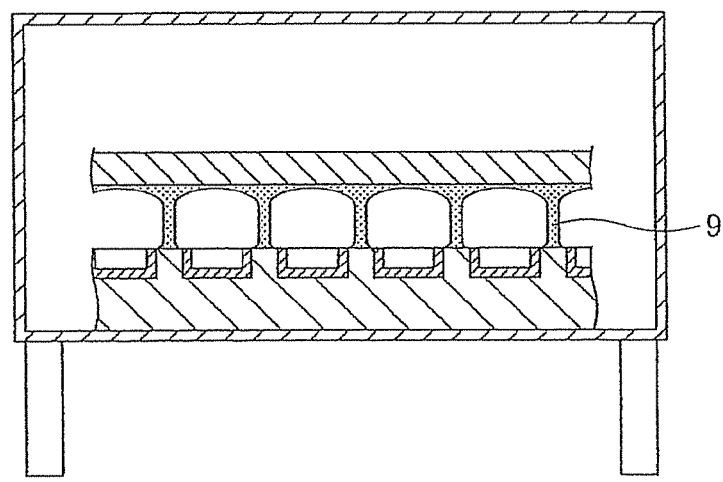

FIG. 10B illustrates a step of reducing the pressure of the pressure reducing container 1 to obtain relatively higher pressures in the depressions 5 that cause the UV-curable material 3 of the film to expand so as to obtain a fine hollow cell array structure 9.

Figure 10C:
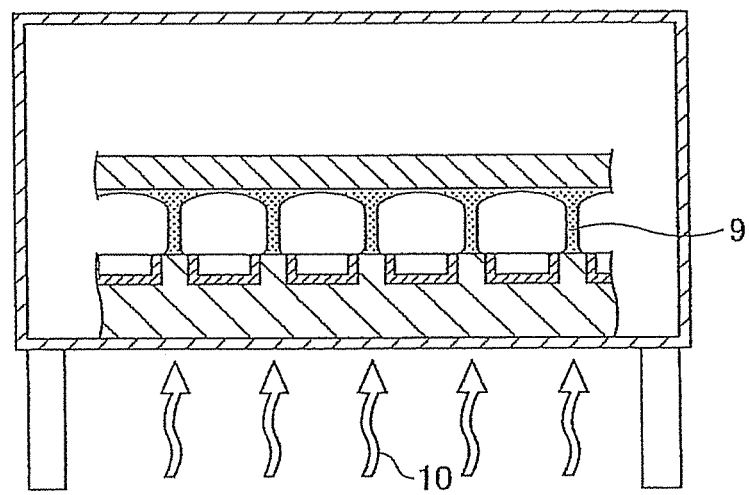

FIG. 10C illustrates a step of radiating UV rays from a lower side of the first substrate 4 (i.e., opposite side from the film) to cure the UV-curable material 3 of the film so as to obtain the partially (selectively) cured fine hollow cell array structure 9.

Figure 10D:
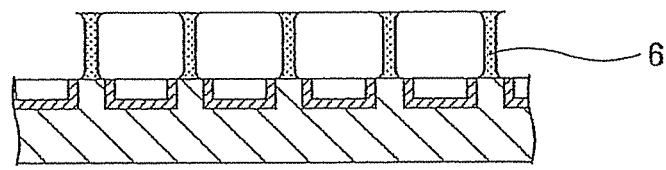
Figure 10E:
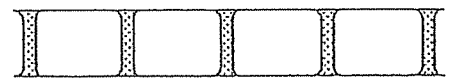
Figure 11:
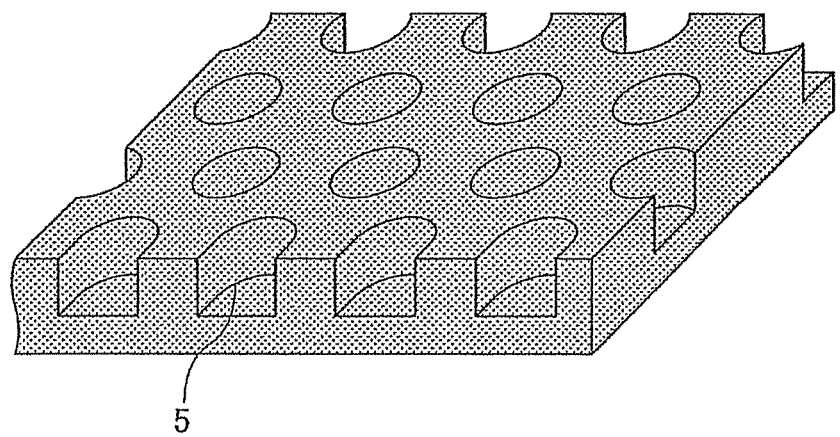
FIG. 11 is a perspective view illustrating an example of a related art substrate formed of a UV ray transmitting material.

FIG. 10D illustrates a step of removing, after having taken out the first substrate 4 and the second substrate 7 and the partially (selectively) cured fine hollow cell array structure 9 from the pressure reducing container 1, the second substrate 7 from the partially (selectively) cured fine hollow cell array structure 9. Note that uncured portions of the fine hollow cell array structure 9 are simultaneously removed with the second substrate 7, and the cured portions of the fine hollow cell array structure 9 remain on the first substrate 4. FIG. 10E illustrates a step of removing a resulting fine hollow cell array structure 6 from the first substrate 4. Note that the step of FIG. 8D and the step of FIG. 8E may be carried out in any order. That is, the step of FIG. 8D and the step of FIG. 8E may be carried out in reverse order.

With this method, the following advantages may be obtained.
1) Since the positions of the surface of the side cell walls subject to expansion approximately match the positions of UV ray transmitting patterns, the side cell walls can be selectively cured without special alignment, and upper cell walls (i.e., a ceiling film) remain uncured.
2) Since the side cell walls are selectively cured and the upper cell walls remain uncured, the side cell walls can be easily removed from the upper cell walls, thereby easily obtaining the hollow cell array structure having upper and lower openings. Note that since unnecessary residual portions of the hollow cell array structure are removed with the second substrate 7, the removed residual portions are not scattered, and the portions of the side cell walls removed from the upper cell walls are smooth.
3) Since the upper and lower openings are formed during a production process of the hollow cell array structure, an additional step for providing the upper and lower openings is unnecessary. Accordingly, the hollow cell array structure 6 can be produced at a relatively low cost.

Figure 15A:
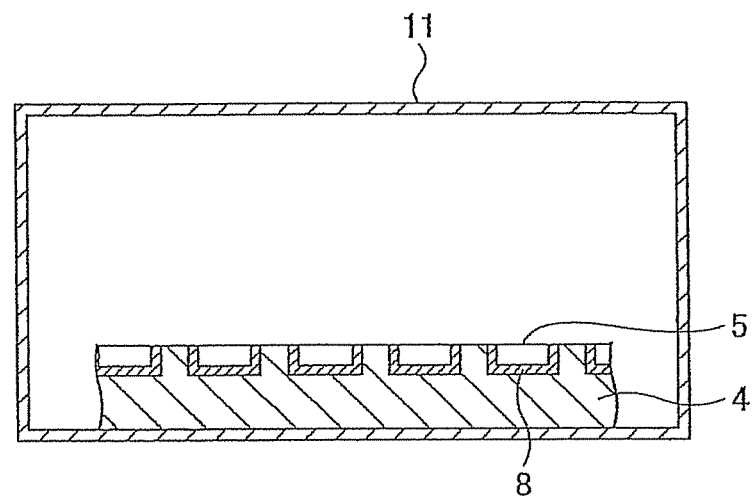
FIG. 15A to FIG. 15F are diagrams illustrating respective steps of a method for producing a hollow cell array structure according to a ninth embodiment.

FIGS. 15A through 15E, 11, 12, 13, and 14 are diagrams illustrating respective steps of a method for producing a hollow cell array structure according to a ninth embodiment. A film is formed of a UV-curable material 3 and a second substrate 7 supporting the UV-curable material 3 (see FIG. 15B). As illustrated in FIG. 15A, a first substrate 4 is configured to include a planer surface portion with depressions 5, which is similar to the related art substrate configuration illustrated in FIG. 11. As illustrated in FIG. 12, the first substrate 4 is made of a UV ray and gas transmitting material and part of its surface and its plural depressions 5 include the light-shielding patterns 8. A specific example of a material for the first substrate 4 includes silicone resin. The light-shielding patterns 8 may be made of any materials that can cut off UV rays but can transmit gases. Examples of such material include carbon and copper. In the ninth embodiment, carbon particles are used as the material for the light-shielding patterns 8. The light-shielding patterns 8 are formed by the application of the carbon particles. FIG. 13 illustrates the first substrate 4 according to the ninth embodiment (i.e., same as the eighth embodiment). As illustrated in FIG. 13, the first substrate 4 includes UV ray transmitting patterns formed over its entire surface and light-shielding pattern formed in its depressions. Note that a pressure control apparatus includes a pressure applying container 11 (see FIG. 15A) and a pressure applying device (not shown), and the pressure control apparatus controls the pressure inside the pressure applying container 1. Note also that a UV radiation apparatus (not shown) is used for radiating UV rays. As illustrated in FIG. 14, the hollow cell array structure 9 is a continuum composed of an upper cell wall (ceiling film) and side cell walls (hollow cell array structure 6).

Next, the steps for producing the hollow cell array structure having the upper and lower openings is described below.

FIG. 15A illustrates the step of injecting a high pressure gas of 0.1 to 0.5 Mpa into the pressure applying container 11 where a first substrate 4 having depressions 5 is placed, so that depressions 5 of the first substrate 4 are filled with the injected gas.

Figure 15B:
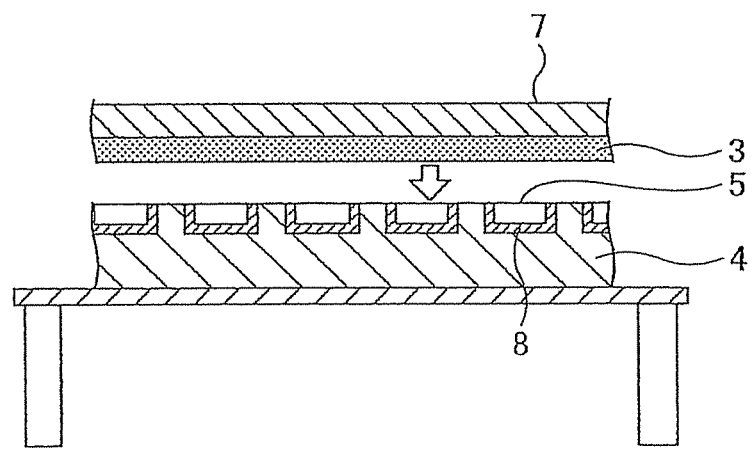

FIG. 15B illustrates a step of removing the first substrate 4 from the pressure applying container 11, placing the first substrate under atmospheric pressure and tightly attaching a film composed of a UV-curable material 3 and a second substrate 7 on the first substrate 4.

Figure 15C:
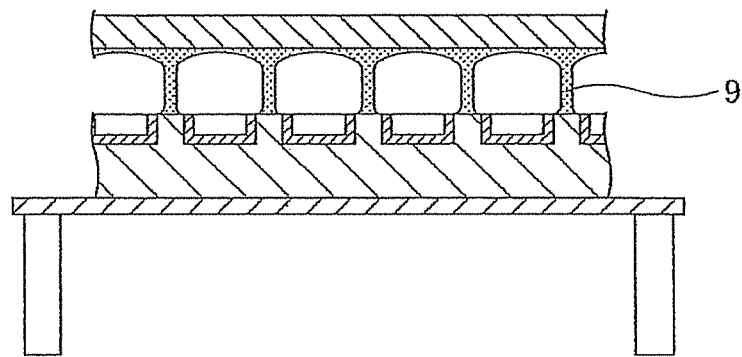

FIG. 15C illustrates a step of causing the UV-curable material 3 of the film to expand due to the pressure differences between the depressions 5 of the first substrate 4 and the atmospheric pressure so as to obtain a fine hollow cell array structure 9.

Figure 15D:
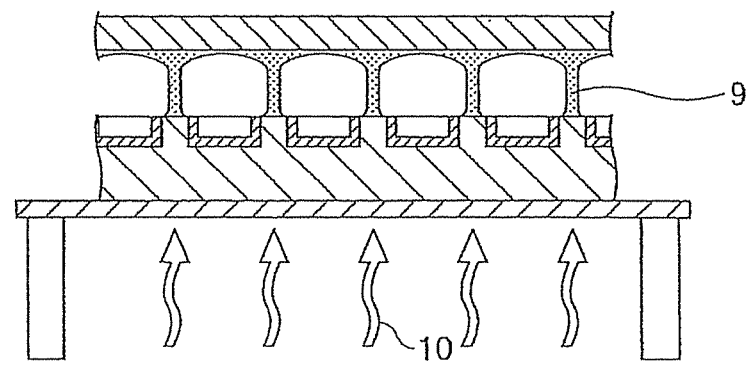

FIG. 15D illustrates a step of radiating UV-rays from a lower side of the first substrate 4 (i.e., opposite side from the film) to cure the UV-curable material 3 of the film so as to obtain the partially (selectively) cured fine hollow cell array structure 9.

Figure 15E:
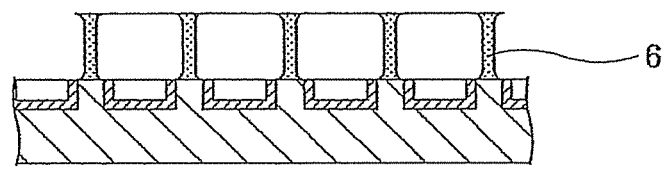

FIG. 15E illustrates a step of removing the second substrate 7 from the partially (selectively) cured fine hollow cell array structure 9 to obtain a resulting hollow cell array structure 6. Note that uncured portions of the fine hollow cell array structure 9 are simultaneously removed with the second substrate 7, and the cured portions of the fine hollow cell array structure 9 remain on the first substrate 4 (see also FIG. 15D).

Figure 15F:
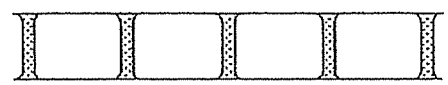

FIG. 15F illustrates a step of removing the resulting fine hollow cell array structure 6 from the first substrate 4. Note that the step of FIG. 15E and the step of FIG. 15F may be carried out in any order. That is, the step of FIG. 15E and the step of FIG. 15F may be carried out in reverse order. With this method, advantages similar to the method according to the eighth embodiment can be obtained. Note that since UV rays are selectively but directly applied to the fine hollow cell array structure 9 without being interrupted by the pressure reducing container 1 used in the eighth embodiment, the radiation efficiency obtained in the method according to the ninth embodiment may be greater than that obtained in the method according to the eighth embodiment.

Figure 16:
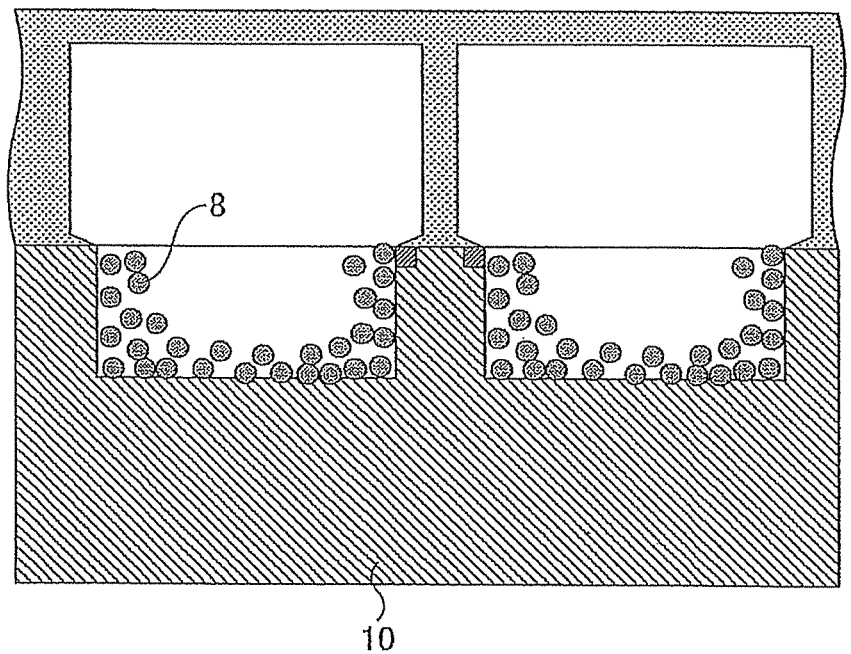
FIG. 16 is a sectional view illustrating configurations of the depressions and spaces formed in a fine hollow cell array structure according to a tenth and an eleventh embodiments.

FIGS. 12, 13, and 16 are diagrams illustrating respective steps of a method for producing a hollow cell array structure according to a tenth embodiment. The hollow cell array structure 9 according to the tenth embodiment is configured such that UV rays that have transmitted via the UV ray transmitting patterns on the surface of the first substrate 4 reliably pass through the fine hollow cell array structure 9 without allowing the UV rays to leak to spaces adjacent to the hollow cell array structure 9 (see FIG. 9). In order not to allow the UV rays to leak to spaces adjacent to the hollow cell array structure 9, the difference in the refractive indexes of the hollow cell array structure 9 and the spaces adjacent to hollow cell array structure 9 is used for the application of UV rays. The UV rays are applied at angles at which the UV rays are totally reflected off interfaces between the hollow cell array structure 9 and the spaces adjacent to hollow cell array structure 9. The shapes and dimensions of the light-shielding pattern 8 of the first substrate 4 are thus defined as below. A detailed configuration of the light-shielding pattern 8 according to the tenth embodiment is described with reference to FIG. 9.

The light-shielding pattern 8 is configured to satisfy the following relationship represented by $\tan\theta 2 < B/A$. A description for computing the relationship $\tan\theta 2 < B/A$ is given below.

The total internal reflection light angle $\theta 1$ in the fine hollow cell array structure 9 is represented by the following equation: $\sin\theta 1 = Na/Nb$. In this equation, Na represents a refractive index in space and Nb represents a refractive index in the fine hollow cell array structure 9.

The configuration (shape) of light-shielding pattern is represented by the following equation: $\tan\theta 2 = B/A$. Since the light-shielding pattern 8 shields UV rays at the light-shielding ratio of B/A to satisfy the relationship represented by $\theta 1 < \theta 2$, only the total internal reflection light is transmitted in the fine hollow cell array structure 9. Accordingly, the UV rays may efficiently pass through side cell walls of the fine hollow cell array structure 9 without allowing the UV rays to pass through upper cell walls (i.e., a ceiling film) of the fine hollow cell array structure 9 (i.e., fine hollow cell array structure 9 may be selectively cured by UV rays). Note that a material for the light-shielding pattern 8 includes carbon particles and a binder having a refractive index similar to that of the first substrate 4.

The total internal reflection light angle is obtained as follows.

Refractive index of space (Air) Na=1
Refractive index of the fine hollow cell array structure (acrylic UV-curable resin) Nb=1.49

The above values are applied to the following equations:

$$\sin \theta 1 = Na/Nb = 1/1.49 = 0.671$$

$$\theta 1 = 42°$$

Since there is a relationship represented by θ1<θ2, θ2 is greater than 42°.

If A is 10 μm (see FIG. 9), $$B = A * \tan \theta 2 = 9 \text{ μm}.$$

Therefore, B is 9 μm or longer based on the relationship of tan θ2<B/A.

With this method, since UV rays are applied via the UV ray transmitting patterns of the first substrate 4 to the fine hollow cell array structure 9 at incident angles at which the UV rays are totally reflected off interfaces between the side cell walls and spaces of the fine hollow cell array structure 9, the UV rays selectively pass through inner portions of the side cell walls and do not pass through other portions of the fine hollow cell array structure 9. Accordingly, the inner portions of the side cell walls are selectively cured and other portions, in particular, the upper cell walls (i.e., the ceiling film) remain uncured, thereby obtaining a honeycomb structure having upper and lower open ends (i.e., hollow cell array structure 6).

FIGS. 12, 13, and 16 are diagrams also illustrating respective steps of a method for producing a hollow cell array structure according to an eleventh embodiment. The fine hollow cell array structure 9 according to the eleventh embodiment is configured such that UV rays that have transmitted the UV ray transmitting patterns on the surface of the first substrate 4 more efficiently pass through the fine hollow cell array structure 9 than that of the tenth embodiment without allowing the UV rays to leak to spaces adjacent to the fine hollow cell array structure 9 (see FIG. 9). In order to pass UV rays through the fine hollow cell array structure 9 more efficiently without allowing the UV rays to leak to spaces adjacent to the fine hollow cell array structure 9, the UV rays are applied at incident angles at which the UV rays are totally reflected off interfaces between the first substrate 4 and the light-shielding pattern 8.

A detailed configuration of the light-shielding pattern 8 according to the eleventh embodiment is similar to that of the tenth embodiment; however, in the eleventh embodiment, carbon particles are used as a material for the light-shielding pattern 8. Silicone rubber is used as a material for the first substrate 4. The total internal reflection light angle is obtained as follows. Since the carbon particles are used for the light-shielding patterns 8, an interface between the first substrate 4 and the light-shielding patterns 8 includes silicone rubber and air.

Accordingly,

Refractive index in air Na:1
Refractive index in fine hollow cell array structure (silicone rubber) Nb=1.4

The above values are applied to the following equations:

$$\sin \theta 2 = Na/Nb = 1/1.4 = 0.714$$

$$\theta 2 = 45.6°$$

Since θ1=42° and θ2=45.6°, the relationship represented by θ1<θ2 is satisfied.

Similar to the tenth embodiment, the configuration (shape) of the light-shielding pattern 8 is represented by the following relationship: tan θ2<B/A. In the tenth embodiment, B is computed as 9 μm, and if B is 9 μm or longer, transmission efficiency of UV rays may be lowered. In the eleventh embodiment, an incident angle for total internal reflection of light in the first substrate is θ2=45.6°. Accordingly, even if B is 9 μm or longer, UV rays are totally reflected back internally. Accordingly, the reflected UV rays may reach the fine hollow cell array structure 9 without lowering the transmission efficiency of the UV rays.

Since the refractive index (1.4) of the material for the first substrate 4 (silicone rubber) is lower than the refractive index (1.49) of the fine hollow cell array structure 9, the total internal reflection angle of the first substrate 4 is θ2=45.6°, and the total internal reflection angle of the fine hollow cell array structure 9 is θ1=42°, resulting in θ1<θ2, UV rays may be applied within the total internal reflection angle region of the fine hollow cell array structure 9.

FIG. 17A to FIG. 17E are diagrams illustrating respective steps of a method for producing a hollow cell array structure according to a twelfth embodiment.

The configuration of the hollow cell array structure according to the twelfth embodiment is the same as those of the eighth and ninth embodiments.

Next, the production steps are described along the description of the twelfth embodiment with reference to FIGS. 17A to 17E.

Figure 17A:
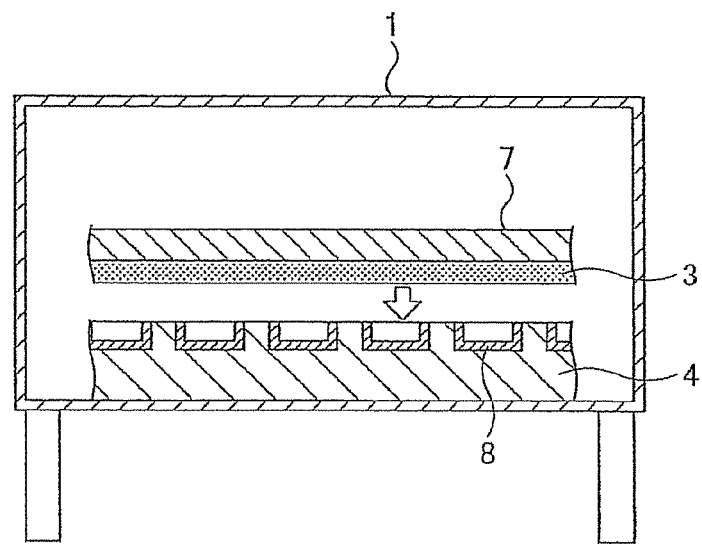
FIG. 17A to FIG. 17E are diagrams illustrating respective steps of a method for producing a hollow cell array structure according to a twelfth embodiment.

FIG. 17A illustrates a step of tightly attaching a film composed of a UV-curable material 3 and a second substrate 7 on a first substrate 4, and placing the obtained product in the pressure reducing container 1 in the same manner as the eighth embodiment.

Figure 17B:
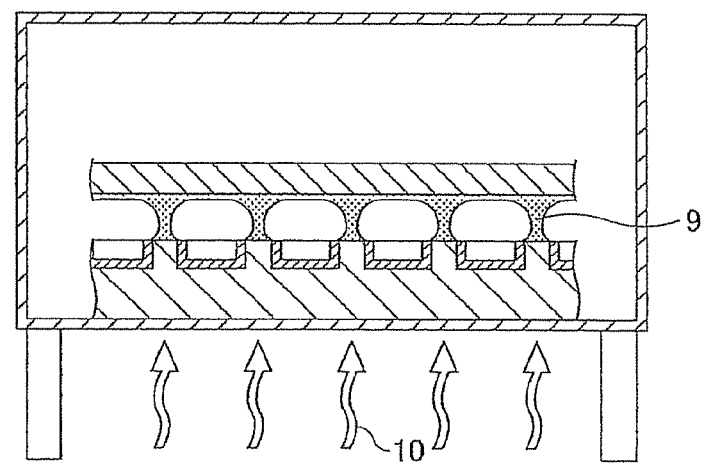

FIG. 17B illustrates a step of gradually reducing the pressure (0.001 MPa/s) of the pressure reducing container 1 to relatively create greater pressure in the depressions 5 and cause the UV-curable material 3 of the film to expand so as to obtain a fine hollow cell array structure 9. At the same time, the radiating UV-rays from a lower side of the first substrate 4 (i.e., opposite side from the film) to cure the UV-curable material 3 of the film.

Figure 17C:
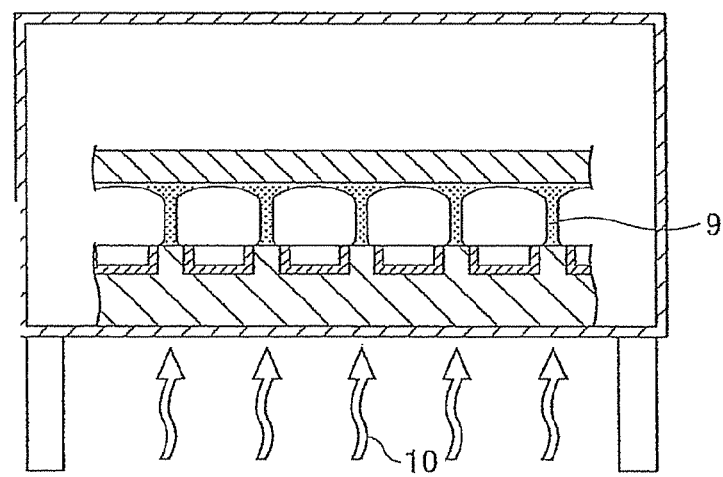

FIG. 17C illustrates a step of expanding the fine hollow cell array structure 9 to predetermined dimensions and selectively radiating UV-rays to cure the material 3 of the film, thereby obtaining a partially (selectively) cured fine hollow cell array structure 9.

Figure 17D:
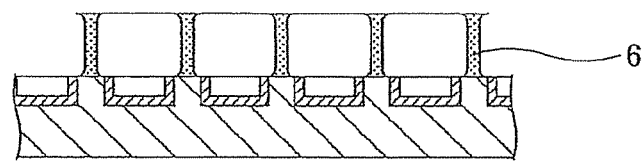

FIG. 17D illustrates a step of removing the second substrate 7 from the partially (selectively) cured fine hollow cell array structure 9 in the same manner as the eighth embodiment.

Figure 17E:
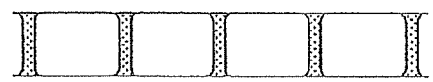

FIG. 17E illustrates a step of removing a resulting fine hollow cell array structure 6 from the first substrate 4 in the same manner as the eighth embodiment.

With this method of the twelfth embodiment, advantages similar to the method according to the eighth embodiment can be obtained. Other advantages are as follows. In the eighth embodiment, after the fine hollow cell array structure 9 is expanded to the predetermined dimensions, the expanded fine hollow cell array structure 9 is cured by the application of UV rays; however, with this method, the fine hollow cell array structure 9 may be deformed while curing the fine hollow cell array structure 9. By contrast, in the method of the twelfth embodiment, since the fine hollow cell array structure 9 is gradually expanded and cured in the repeated manner, the fine hollow cell array structure 9 may be cured without its deformation.

Figure 18:
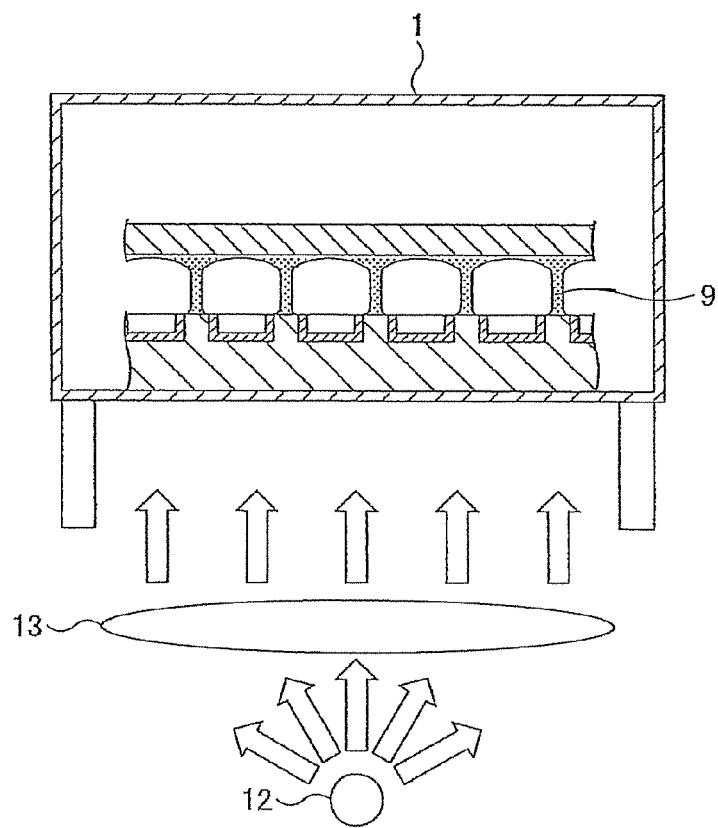
FIG. 18 is a diagram illustrating part of steps of a method for producing a hollow cell array structure according to a thirteenth embodiment.

FIG. 18 is a diagram illustrating part of steps of a method for producing a hollow cell array structure according to a thirteenth embodiment. The method of the thirteenth embodiment is basically the same as those of the eighth and ninth embodiments except for a UV radiation step illustrated in FIG. 18. A UV radiation apparatus 12 (see FIG. 18) is a light source apparatus used for radiating UV rays. A collimator lens 13 is an optical apparatus used for aligning the radiated UV rays in parallel. Next, the UV radiation step is described below. The UV radiation step of the thirteenth embodiment is similar to that of the eighth embodiment except the use of the collimator lens 13. With the collimator lens 13, parallel UV rays are applied to the first substrate 4. With this method, advantages similar to the method according to the eighth embodiment can be obtained. Another advantage is as follows. Since parallel UV rays are applied to the first substrate 4, the UV rays may be less shielded by the shielding patterns 8. Accordingly, UV rays are more reliably transmitted in the fine hollow cell array structure 9.

As described in one of the above embodiments, the method for producing a hollow cell array structure includes a first step of layering a deformable material capable of being plastically deformed under a predetermined condition on a first substrate, the first substrate having plural, mutually separated depressions in its upper surface, such that the deformable material forms an isolated space in each of the plural depressions; a second step of expanding the space in each of the plural depressions by inducing gas pressure in the spaces while extending the deformable material, such that plural hollow cells are simultaneously formed in correspondence to the plural depressions in predetermined directions; and a third step of selectively solidifying predetermined portions of the plural hollow cells.

With this method, a hollow cell array structure having openings at upper and lower surfaces may be obtained. Accordingly, a hollow cell array structure suitable for being injected with filler may be stably produced at low cost without post-processing such as removing a ceiling film from the obtained fine hollow cell structure. Since the hollow cells have respective openings at upper and lower surfaces, the hollow cells may be sealed with a material differing from the material forming the hollow cells. More specifically, the hollow cells may be sealed with a transparent material having a low electric resistance to form a sealing surface, which is suitable for use in the opening surface of the electrophoretic display. In addition, the opening surface of the hollow cell array structure may be connected to a transparent electrode plate.

Further, in the above embodiments, since the deformable material capable of being cured by the application of the UV rays is extended, with the deformable material being sandwiched between the first substrate and the second substrate having predetermined-shaped light-shielding patterns, and the UV rays are applied to the deformable material via the predetermined-shaped light-shielding patterns on the second substrate, desired portions of the hollow cells may be cured. As a result, a fine hollow cell array structure having openings at upper and lower surfaces may be obtained. Accordingly, the fine hollow cell array structure suitable for being injected with filler may be stably produced at low cost without post-processing such as removing a ceiling film from the obtained hollow cell structure. Since the hollow cells have respective openings at upper and lower surfaces, the hollow cells may be sealed with a material differing from the material forming the hollow cells. More specifically, the hollow cells may be sealed with a transparent material having a low electric resistance, which is suitable for use in the opening surface of the display, to directly form a sealing surface. In addition, the opening surface of the hollow cell array structure may be directly connected to a transparent electrode plate.

Further, in another embodiment, since the deformable material capable of being solidified by drying is extended, with the deformable material being sandwiched between the first substrate and the second substrate having predetermined-shaped porous patterns, and the deformable material is dried via the porous patterns on the second substrate, desired portions of the hollow cells may be solidified. As a result, a hollow cell array structure having openings at upper and lower surfaces may be obtained. Accordingly, a hollow cell array structure suitable for being injected with filler may be stably produced at low cost without post-processing such as removing a ceiling film from the obtained hollow cell structure. Since the hollow cells have the respective openings at upper and lower surfaces, the hollow cells may be sealed with a material differing from the material forming the hollow cells. More specifically, the hollow cells may be sealed with a transparent material having a low electric resistance, which is suitable for use in the opening surface of the display, to directly form a sealing surface. In addition, the opening surface of the hollow cell array structure may be directly connected to a transparent electrode plate.

Further, in another embodiment, since the deformable material capable of being solidified by cooling is extended, with the deformable material being sandwiched between the first substrate and the second substrate having predetermined-shaped heating patterns, and the deformable material is cooled via the predetermined-shaped heating patterns on the second substrate, desired portions of the hollow cells that are not in contact with the predetermined-shaped heating patterns may be solidified. As a result, a hollow cell array structure having openings at upper and lower surfaces may be obtained. Accordingly, the hollow cell array structure suitable for being injected with filler may be stably produced at low cost without post-processing such as removing a ceiling film from the obtained hollow cell structure. Since the hollow cells have the respective openings at upper and lower surfaces, the hollow cells may be sealed with a material differing from the material that forms the hollow cells. More specifically, the hollow cells may be sealed with a transparent material having a low electric resistance, which is suitable for use in the opening surface of the display, to directly form a sealing surface.

Further, in another embodiment, since the deformable material capable of being cured by the application of the UV rays is extended, with the deformable material being sandwiched between the first substrate and the second substrate having predetermined-shaped water repellent surface patterns, and the UV rays are applied to the deformable material via the predetermined-shaped water repellent surface patterns on the second substrate, desired portions of the hollow cells may be solidified. As a result, a hollow cell array structure having openings at upper and lower surfaces may be obtained. Accordingly, the fine hollow cell array structure suitable for being injected with filler may be stably produced at low cost without post-processing such as removing a ceiling film from the obtained hollow cell structure. Since the hollow cells have the respective openings at upper and lower surfaces, the hollow cells may be sealed with a material differing from the material forming the hollow cells. More specifically, the hollow cells may be sealed with a transparent material having a low electric resistance, which is suitable for use in the opening surface of the display, to directly form a sealing surface.

Further, in another embodiment, since the deformable material capable of being cured by the application of the UV rays is extended, with the deformable material being sandwiched between the first substrate and the second substrate having predetermined-shaped lipophobic surface patterns, and the UV rays are applied to the deformable material via the predetermined-shaped lipophobic surface patterns on the second substrate, desired portions of the hollow cells may be solidified. As a result, a hollow cell array structure having openings at upper and lower surfaces may be obtained. Accordingly, the hollow cell array structure suitable for being injected with filler may be stably produced at low cost without post-processing such as removing a ceiling film from the obtained hollow cell structure. Since the hollow cells have the respective openings at upper and lower surfaces, the hollow cells may be sealed with a material differing from the material forming the hollow cells. More specifically, the hollow cells may be sealed with a transparent material having a low electric resistance, which is suitable for use in the opening surface of the display, to directly form a sealing surface.

Further, in another embodiment, since the deformable material capable of being cured by the application of the UV rays is extended, with the deformable material being sandwiched between the first substrate and the second substrate having predetermined-shaped light-shielding patterns, and UV rays are applied to the deformable material via the predetermined-shaped light-shielding patterns on the second substrate correspond to locations of the depressions, desired portions of the hollow cells may be selectively cured excluding ceiling portions thereof. As a result, a hollow cell array structure having openings at upper and lower surfaces may be obtained.

Further, in the third step, since the UV rays are applied via the UV ray transmitting patterns, side cell walls of honeycomb cells (i.e., the hollow cells) are selectively cured and upper cell walls of the hollow cells remain uncured. Accordingly, a hollow cell array structure (i.e., honeycomb structure) having openings at upper and lower surfaces (i.e., having open ends at upper and lower surfaces) may be produced.

In the third step, since UV rays are applied via the UV ray transmitting patterns of the first substrate 4 to the fine hollow cell array structure 9 at incident angles at which the UV rays are totally reflected off interfaces between the side cell walls and spaces of the fine hollow cell array structure 9, the UV rays selectively pass through inner portions of the side cell walls and do not pass through other portions of the fine hollow cell array structure 9. Accordingly, the inner portions of the side cell walls are selectively cured and other portions, in particular, the upper cell walls (i.e., the ceiling film) remain uncured, thereby obtaining a honeycomb structure having upper and lower open ends (i.e., hollow cell array structure 6).

Further, if the third step is simultaneously carried out with the second step, damage to the hollow cells may be effectively prevented. Accordingly, a hollow cell array structure (i.e., honeycomb structure) having openings at upper and lower surfaces (i.e., having open ends at upper and lower surfaces) may be produced.

Further, since UV ray transmitting portions (UV ray transmitting patterns) are formed over an entire surface of the first substrate and the light-shielding patterns are formed over an entire surface of each of the plural depressions of the first substrate, optical paths of the UV rays that pass through the first substrate may be reliably controlled.

Further, since UV ray transmitting portions (UV ray transmitting patterns) are formed on part of a surface of the first substrate and the light-shielding patterns are formed on part of a surface of each of the plural depressions of the first substrate, optical paths of the UV rays that pass through the first substrate may be reliably controlled, damage to the hollow cells may be prevented, and thinner side cell walls may be formed.

In the third step, since incident angles of UV rays to the first substrate are controlled based on the UV ray transmitting patterns and the shielding patterns of the first substrate such that the applied UV rays are totally reflected off interfaces between cell walls and corresponding spaces in the plural hollow cells, optical paths of the UV rays that pass through the first substrate may be reliably controlled, the inner portions of the side cell walls are selectively cured and other portions, in particular, the upper cell walls (i.e., the ceiling film) remain uncured, thereby obtaining a honeycomb structure having upper and lower open ends (i.e., hollow cell array structure).

Moreover, since the collimator is used for the application of UV rays to the first substrate, parallel rays are applied to the first substrate. Accordingly, the incident angles of the UV rays may be effectively controlled such that the UV rays are totally reflected off interfaces between the side cell walls and corresponding spaces of the fine hollow cell array structure.

Further, since the shielding patterns are made of a material that absorbs UV radiation, the UV rays may be effectively shielded and irregular reflection of the UV rays may be effectively prevented. Accordingly, optical paths of the UV rays may be reliably controlled.

Moreover, since the material for the shielding patterns also includes a refractive index lower than a material for the UV ray transmitting patterns, the UV rays are totally reflected back internally in the first substrate, and the UV rays are effectively utilized even if the length B of the light shielding pattern is increased. Accordingly, the honeycomb material may be effectively cured With low energy consumption. Further, since a refractive index of a material for the UV ray transmitting pattern on the first substrate is lower than a refractive index of a material for the hollow cell structure, the UV rays may be applied within the total internal reflection angle region of the fine hollow cell array structure 9.

Since the hollow cell structure is produced by an apparatus that carries out the above described steps of the method for producing the hollow cell structure, the hollow cell structure is produced with highly accurate dimensions at low production cost in comparison to that produced via secondary processing.

Further, surfaces of the cured portions from which the uncured portions are removed are smooth, so that the hollow cell structure may be produced without roughness.

The present invention is not limited to the specifically disclosed embodiment, and variations and modifications may be made without departing from the scope of the present invention.

This patent application is based on Japanese Priority Patent Application No. 2009-163724 filed on Jul. 10, 2009, and Japanese Priority Patent Application No. 2010-137154 filed on Jun. 16, 2010, the entire contents of which are hereby incorporated herein by reference.

The invention claimed is:

1. A method for producing a hollow cell array structure, comprising:
  layering a deformable material capable of being cured by evaporation of a solvent contained within the deformable material on a first substrate, the first substrate having plural, mutually separated depressions, such that the deformable material forms mutually isolated spaces in the corresponding depressions;

layering a second substrate having solvent transmittable patterns on the first substrate having the plural depressions via the deformable material forming the mutually isolated spaces in the plural depressions, and expanding the spaces in the plural depressions by inducing a gas pressure of the spaces while extending the deformable material, such that plural hollow cells are contemporaneously formed m correspondence to the plural depressions in defined directions; and selectively solidifying side cell walls of the plural hollow cells by selectively evaporating the solvent from the deformable material of the side cell walls of the plural hollow cells via the solvent transmittable patterns formed on the second substrate, the side cell walls being located in directions substantially perpendicular to the substrate, wherein in the selectively solidifying, the side cell walls of the plural hollow cells are selectively solidified by selectively evaporating the solvent from the deformable material thereto via the solvent transmittable of the first substrate.

2. The method as claimed in claim 1, wherein the selectively solidifying is simultaneously carried out with the expanding to selectively solidify the side cell walls of the plural hollow cells.

3. The method as claimed in claim 1, wherein the second substrate includes shaped water repellent surface patterns.

4. The method as claimed in claim 1, wherein the second substrate includes shaped lipophobic surface patterns.

* * * * *